US012707186B2

(12) United States Patent
Kong et al.

(10) Patent No.: US 12,707,186 B2
(45) Date of Patent: Aug. 11, 2026

(54) WIRELESS HEADSET SYSTEM AND WIRELESS HEADSET

(71) Applicant: Huawei Technologies Co., Ltd., Shenzhen (CN)

(72) Inventors: Liang Kong, Xi'an (CN); Xuelian Liu, Xi'an (CN); Kelin Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 133 days.

(21) Appl. No.: 18/557,856

(22) PCT Filed: Mar. 28, 2022

(86) PCT No.: PCT/CN2022/083433
§ 371 (c)(1),
(2) Date: Oct. 27, 2023

(87) PCT Pub. No.: WO2022/227980
PCT Pub. Date: Nov. 3, 2022

(65) Prior Publication Data
US 2024/0223935 A1 Jul. 4, 2024

(30) Foreign Application Priority Data
Apr. 30, 2021 (CN) ......................... 202110484190.9

(51) Int. Cl.
*H04R 1/10* (2026.01)
*A45C 11/00* (2006.01)
*H04R 1/1025* (2026.01)

(52) U.S. Cl.
CPC ............ *H04R 1/1091* (2013.01); *A45C 11/00* (2013.01); *H04R 1/1016* (2013.01); *A45C 11/001* (2025.01); *H04R 1/1025* (2013.01)

(58) Field of Classification Search
CPC .. H04R 1/1091; H04R 1/1016; H04R 1/1025; A45C 11/00; A45C 11/001
See application file for complete search history.

(56) References Cited

U.S. PATENT DOCUMENTS

2012/0170177 A1* 7/2012 Pertuit .................. G06F 1/1684 361/679.01
2020/0077192 A1* 3/2020 Prevoir .................. C08G 63/16
(Continued)

FOREIGN PATENT DOCUMENTS

CN 107809696 A 3/2018
CN 110602584 A 12/2019
(Continued)

*Primary Examiner* — Joseph Saunders, Jr.
(74) *Attorney, Agent, or Firm* — Slater Matsil, LLP

(57) ABSTRACT

This application relates to a wireless headset system and a wireless headset. The wireless headset system includes the wireless headset and a case. The case includes a lower cover, an upper cover, and an accommodation compartment. A first magnet is disposed on the upper cover. The wireless headset includes a processor and a magnetic sensor coupled to the processor. The magnetic sensor is configured to detect a magnetic field vector around the wireless headset, and transmit the detected magnetic field vector to the processor. The processor determines a status of the wireless headset based on the received magnetic field vector. The status of the wireless headset includes at least a state in which the case is closed and the headset is placed in the case, a state in which the case is open and the headset is placed in the case, and an out-of-case state.

18 Claims, 11 Drawing Sheets

(56) References Cited

U.S. PATENT DOCUMENTS

| | | | | |
|---|---|---|---|---|
| 2020/0233046 | A1* | 7/2020 | Ding .................... | G01R 33/072 |
| 2021/0337303 | A1* | 10/2021 | Macomber ........... | A45C 11/001 |
| 2022/0043078 | A1* | 2/2022 | Zucker ................. | G01R 33/072 |

FOREIGN PATENT DOCUMENTS

| | | | |
|---|---|---|---|
| CN | 212850950 | U | 3/2021 |
| WO | 2020149918 | A1 | 7/2020 |

* cited by examiner

WIRELESS HEADSET SYSTEM AND WIRELESS HEADSET

CROSS-REFERENCE TO RELATED APPLICATIONS

This application is a national stage of International Application No. PCT/CN2022/083433, filed on Mar. 28, 2022, which claims priority to Chinese Patent Application No. 202110484190.9, filed on Apr. 30, 2021. Both of the aforementioned applications are incorporated herein by reference in their entireties.

TECHNICAL FIELD

This application relates to the field of electronic technologies, and in particular, to a wireless headset system and a wireless headset.

BACKGROUND

In recent years, appearance and experience of wearable products have attracted increasing attention. A requirement for miniaturization experience of a wireless headset like a true wireless stereo (true wireless stereo, TWS) headset is increasingly strong, and a status relationship between a headset and a case (for example, a headset case) is increasingly diversified.

Currently, the status relationship between the headset and the case may be detected by disposing a single-axis Hall effect sensor and disposing a magnet at a corresponding position of the case. However, the single-axis Hall effect sensor can set only one threshold, and is mainly configured to detect whether a magnetic field exists, and a magnetic field threshold of the single-axis Hall effect sensor cannot be adjusted. In this case, position/status information of the headset is monotonous, and only detection of two switchable states is performed, including in-case detection and out-of-case detection. In addition, open and closed states of the case need to be detected and determined by using the case, and the headset is notified by using an electrical or signal connection mechanism (for example, a communication pin) between the case and the headset. In this case, once the case is abnormal, for example, when the case is out of power or a pin electrically connected to the headset is excessively corroded, the case cannot timely notify the headset of a detected open or closed state, which causes a delay in starting the headset. In addition, after the case is opened, and the headset is out of the case, the headset cannot be timely connected to an electronic product like a mobile phone, which is likely to cause an audio dropout and affect user experience such as calling and music listening.

SUMMARY

In view of this, it is necessary to provide a wireless headset system and a wireless headset, so that the headset can independently detect a plurality of types of position/status information, effectively improving user experience.

According to a first aspect, this application provides a wireless headset system. The wireless headset system includes a wireless headset and a case. The case includes a lower cover, an upper cover, and an accommodation compartment. The wireless headset may be accommodated in the accommodation compartment. A first magnet is disposed on the upper cover. The wireless headset includes a processor and a magnetic sensor coupled to the processor. The magnetic sensor is configured to detect a magnetic field vector around the wireless headset, and transmit the detected magnetic field vector to the processor. The processor determines a status of the wireless headset based on the received magnetic field vector. The status of the wireless headset includes at least a state in which the case is closed and the headset is placed in the case, a state in which the case is open and the headset is placed in the case, and an out-of-case state. Clearly, the wireless headset may detect a plurality of types of position/status information (for example, at least the foregoing three types of status information) of the headset relative to the case, and detection may be independent of the case. In this case, if the headset cannot be timely notified due to abnormality of the case, the headset can still timely connect to an electronic product such as a mobile phone after the case is opened and the headset is out of the case, and user experience such as calling and music listening is not affected. According to the solution in this embodiment of this application, the wireless headset can independently determine the status of the wireless headset, and does not need to depend on communication with the case. This further effectively improves user experience.

In a possible design, the wireless headset may further control and implement power-on/off of the wireless headset based on the magnetic field vector detected by the magnetic sensor. The wireless headset can independently implement power-on/off and determine the status of the wireless headset, and does not need to depend on communication with the case. This further effectively improves user experience.

In a possible design, a second magnet is disposed on the lower cover. Clearly, in this design, a magnet, for example, the second magnet, is added to the lower cover, so that a difference in magnetic field vectors detected by the magnetic sensor may be more obvious when the case is open, the case is closed, and the headset is out of the case. This further effectively improves accuracy of status detection of the wireless headset, in other words, the wireless headset has more accurate status detection effect. Further, if magnet directions of magnets (for example, the first magnet and the second magnet) on the upper cover and the lower cover are the same, the upper cover and the lower cover can be quickly closed within a specific distance range. A user needs to overcome adherence between the upper cover and the lower cover, to smoothly open the case. This improves tactile experience when the user opens and closes the case.

In a possible design, a third magnet is disposed on the upper cover, and is configured to adsorb the wireless headset to the upper cover. Clearly, the third magnet is disposed on the upper cover, so that the wireless headset can be effectively adsorbed to the upper cover.

In a possible design, the status of the wireless headset further includes a state in which the case is open and the headset is placed on the upper cover of the case. The processor can determine, based on the magnetic field vector, that the wireless headset is in the state in which the case is open and the headset is placed on the upper cover of the case. Clearly, the third magnet is disposed on the upper cover, so that the wireless headset can detect more position/status information, for example, the state in which the case is open and the headset is placed on the upper cover of the case. Detection may be independently performed without depending on communication with the case. This further effectively improves user experience.

In a possible design, the third magnet and the first magnet are disposed at intervals, or the third magnet and the first magnet are connected together. Clearly, the first magnet and the third magnet may be independent magnets, and the first magnet and the third magnet are disposed at intervals. Certainly, the first magnet and the third magnet may alternatively be disposed (or connected) together to form an entirety, that is, form a large magnet. Alternatively, the third magnet may not be disposed, but a size of the first magnet is directly adjusted, to form a large magnet. In other words, in this embodiment of this application, detection of at least four states may also be implemented by disposing at least two magnets.

In a possible design, the magnetic sensor is a three-axis Hall effect sensor. Clearly, the three-axis Hall effect sensor is disposed, so that the headset can read magnitudes of magnetic fields in three directions, namely an x-axis, a y-axis, and a z-axis. This can be used in detection of at least three types of position/status information (for example, the out-of-case state, the state in which the case is closed and the headset is placed in the case, and the state in which the case is open and the headset is placed in the case) of the wireless headset. In addition, the three-axis Hall effect sensor has a mass production capability for extension of a plurality of states. In this way, detection of a plurality of states can be performed by one device, and expandability is high. In addition, more reliable and diversified status detection can be implemented based on current interaction between electricity and a wireless communication mechanism (such as power-on/off, a battery level, two-headset interaction, and left/right headset identification). In addition, in this application, the three-axis Hall effect sensor is disposed, and has a strong anti-interference capability, so that a worse magnetic field environment can be allowed in an external environment, and a product can provide better user experience by using a magnetic field environment.

In a possible design, the magnetic sensor is disposed at a central axis position of the wireless headset. Clearly, the magnetic sensor is disposed at the central axis position of the wireless headset, so that a plurality of types of position/status information can be accurately detected without identifying a headset placement direction and a left headset and a right headset. This resolves a disadvantage in a conventional technology that detection can be performed only in a single direction and detection can be performed only on an in-case state and an out-of-case state of a headset. This implements 360-degree rotation detection without a dead angle.

In a possible design, the wireless headset can rotate freely in the accommodation compartment. That the wireless headset can rotate freely means that the wireless headset can rotate at a specific angle (for example, 45 degrees) or implement 360-degree rotation in the accommodation compartment.

In a possible design, the wireless headset further includes a magnet that is configured to adsorb to the case, so that the wireless headset is accommodated in the case. Clearly, in this application, the magnetic sensor is disposed, and has a strong anti-interference capability, so that a worse magnetic field environment can be allowed in an external environment, and a product can provide better user experience by using a magnetic field environment.

In a possible design, an adsorption magnet is further disposed on the case, and is configured to implement closure and adsorption of both the lower cover and the upper cover of the case. The adsorption magnet is disposed away from the wireless headset. Clearly, in this application, the magnetic sensor is disposed, and has a strong anti-interference capability, so that a worse magnetic field environment can be allowed in an external environment, and a product can provide better user experience by using a magnetic field environment. In addition, the adsorption magnet is disposed away from the wireless headset, so that interference caused by a magnetic field generated by the adsorption magnet to magnetic induction intensity collected by the magnetic sensor of a headset body can be effectively prevented.

In a possible design, the case is a headset case.

In a possible design, the case is a carrier, the carrier is one of a watch, glasses, a necklace, a bracelet, a wristband, a ring, a power bank, an adapter, a handbag, luggage, a head-mounted apparatus, a tie, a mobile phone, a drinking cup, a mouse, a pen, a notebook, a racket, a ball, and a bicycle, and both the carrier and the wireless headset form a fusion product. Clearly, the wireless headset in this application may be applicable to a TWS headset form, and is applicable to all existing and unimplemented fusion products in the industry, such as a headset and a watch, a headset and a necklace, and a headset and glasses. In addition, for different forms of products, multi-level magnetic environment detection can be implemented. In addition, based on magnet cooperation of the case, a magnetization direction of the magnet may be optimized, so that detection is more accurate.

According to a second aspect, an embodiment of this application further provides a wireless headset. The wireless headset may be accommodated in an accommodation compartment of a case. The wireless headset includes a processor and a magnetic sensor coupled to the processor. The magnetic sensor is configured to detect a magnetic field vector around the wireless headset, and transmit the detected magnetic field vector to the processor. The processor determines a status of the wireless headset based on the received magnetic field vector. The status of the wireless headset includes at least a state in which the case is closed and the headset is placed in the case, a state in which the case is open and the headset is placed in the case, and an out-of-case state.

In a possible design, the magnetic sensor is a three-axis Hall effect sensor.

In a possible design, the magnetic sensor is disposed at a central axis position of the wireless headset.

In a possible design, the wireless headset can rotate freely in the accommodation compartment.

In a possible design, the wireless headset is in a cylindrical shape or in a cylindrical-like shape.

In a possible design, the wireless headset further includes a magnet that is configured to adsorb to the case, so that the wireless headset is accommodated in the case.

For technical effect brought by the second aspect, refer to the related descriptions of the wireless headset system in the first aspect. Details are not described herein again.

Figure 1A:
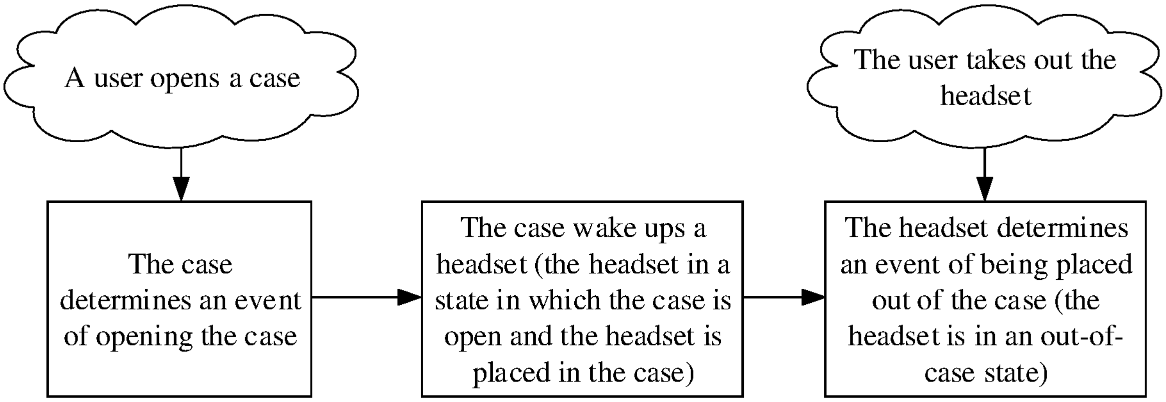
FIG. 1*a* and FIG. 1*b* are schematic diagrams of position/status information detection of a wireless headset according to an embodiment of this application.

Reference numerals of main components:

| | |
|---|---|
| Wireless headset system | 100, 200 |
| Wireless headset | 11, 21 |
| Headset body | 111, 211, 300, 500a, 500b, 700a, 700b |
| Processor | 301, 502 |
| Memory | 302 |
| Sensor module | 303 |
| Magnetic sensor | 303A, 501 |
| Wireless communication module | 304 |
| Audio module | 305 |
| Power module | 306 |
| Input/Output interface | 307 |
| Case | 12, 22, 400, 600, 800 |
| Lower cover | 401, 601, 801 |
| Upper cover | 402, 602, 802 |
| Accommodation compartment | 121, 221, 403a, 403b, 603a, 603b |
| First magnet | 405a, 405b, 605a, 605b, 805a, 805b |
| Second magnet | 404a, 404b, 604a, 604b, 804a, 804b |
| Adsorption magnet | 606 |
| Third magnet | 807a, 807b |

The following specific implementations further describe this application in detail with reference to the foregoing accompanying drawings.

DETAILED DESCRIPTION OF ILLUSTRATIVE EMBODIMENTS

The following describes the technical solutions in embodiments of this application with reference to the accompanying drawings in embodiments of this application. It is clearly that the described embodiments are only some rather than all of embodiments of this application.

Terms such as "first" and "second" mentioned below are only intended for a purpose of description, and shall not be understood as an indication or implication of relative importance or implicit indication of a quantity of indicated technical features. Therefore, a feature limited by "first", "second" and the like may explicitly indicate or implicitly include one or more such features.

In the descriptions of this application, it should be noted that unless otherwise specified or limited, the terms "dispose", "interconnect", and "connect" should be understood in a broad sense. For example, such terms may indicate a fixed connection, a detachable connection, or an integral connection. A person of ordinary skill in the art may understand specific meanings of the foregoing terms in this application according to specific cases.

In recent years, appearance and experience of wearable products have attracted increasing attention. A requirement for miniaturization experience of a wireless headset such as a true wireless stereo (true wireless stereo, TWS) headset is increasingly strong, and a status relationship between a headset and a case (for example, a headset case) is increasingly diversified.

Currently, the status relationship between the headset and the case may be detected by disposing a single-axis Hall effect sensor and disposing a magnet at a corresponding position of the case. For example, refer to FIG. 1*a*. In a first scenario, when a user opens a case, the case may determine an event of opening the case, and wake up the headset. In this case, the headset is in a state in which the case is open and the headset is placed in the case. Then, when the user takes out the headset, the headset determines an event of being placed out of the case. In this case, the headset is in an out-of-case state.

Figure 1B:
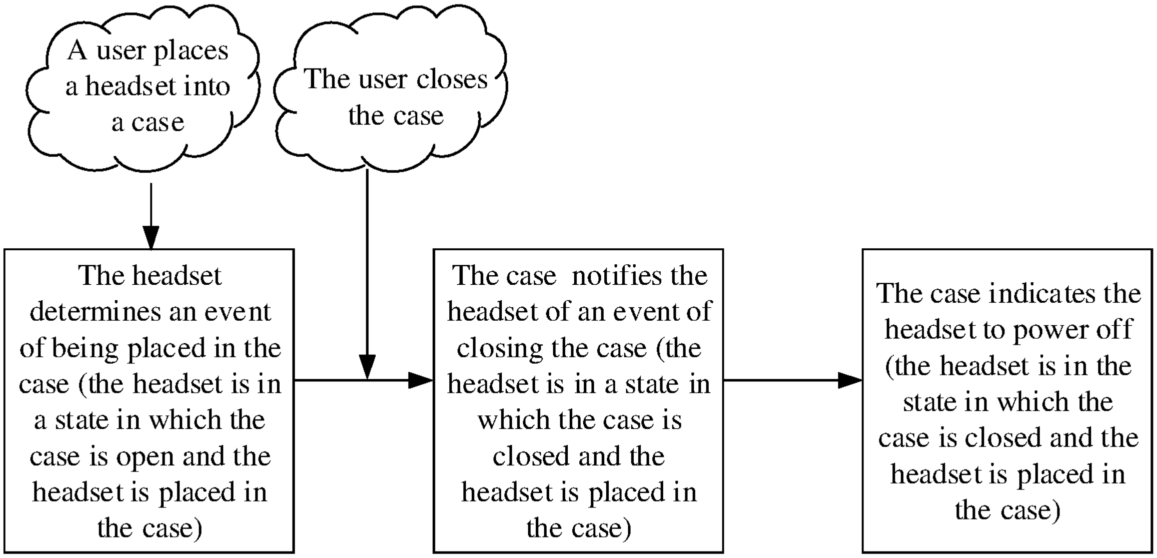

Refer to FIG. 1*b*. In a second scenario, when the user places the headset into the case, the headset determines an event of being placed in the case. In this case, the headset is in the state in which the case is open and the headset is placed in the case. Then, when the user closes the case, the case determines an event of closing the case, and notifies the headset. In this case, the headset is in a state in which the case is closed and the headset is placed in the case. In addition, the case notifies or controls the headset to power off, to save power of the headset.

Clearly, in the foregoing solution, a power-on state of the headset is limited by the case, that is, the case needs to determine the event of opening the case, and wake up the headset by using an electrical connection mechanism (for example, a charging pin). Once the case is abnormal, for example, when the case is out of power or a pin electrically connected to the headset is excessively corroded, the case cannot notify the headset of a detected open state in time, which causes a delay in starting the headset. In this case, the headset cannot timely connect to an electronic product such as a mobile phone after the case is opened and the headset is out of the case, which is likely to cause an audio dropout and affect user experience such as calling and music listening. In addition, the status of the headset cannot be determined independently of the case. After the headset is powered on, the headset needs to obtain the case status (for example, the case is open or closed), and interact with the case through the electrical connection mechanism (for example, the charging pin). In other words, the headset status is determined based on the electrical connection communication mechanism of the case. In addition, as the user pays more attention to experience, corresponding magnets are added to many products to pursue better experience. As a result, a magnetic field environment becomes increasingly complex, and a challenge to a single-axis Hall effect sensor is doubled. Therefore, for a project/product with a complex magnetic field environment, an existing solution for detecting headset position/status information cannot satisfy development of a product function.

Therefore, an embodiment of this application provides a wireless headset and a wireless headset system. The wireless headset may detect a plurality of types of position/status information of the headset relative to the case, and detection may be independent of the case. In this case, if the headset cannot be timely notified due to abnormality of the case, the headset can still timely connect to an electronic product such as a mobile phone after the case is opened and the headset is out of the case, and user experience such as calling and music listening is not affected. According to the solution in this embodiment of this application, the headset can independently determine the status of the wireless headset, and does not need to depend on communication with the case. This further effectively improves user experience. In addition, the wireless headset in this embodiment of this application can reduce requirements of the headset on a magnetic environment and an electrical environment of the case, simplify a product design difficulty, and reliably detect statuses of a plurality of headsets relative to the case.

Figure 2A:
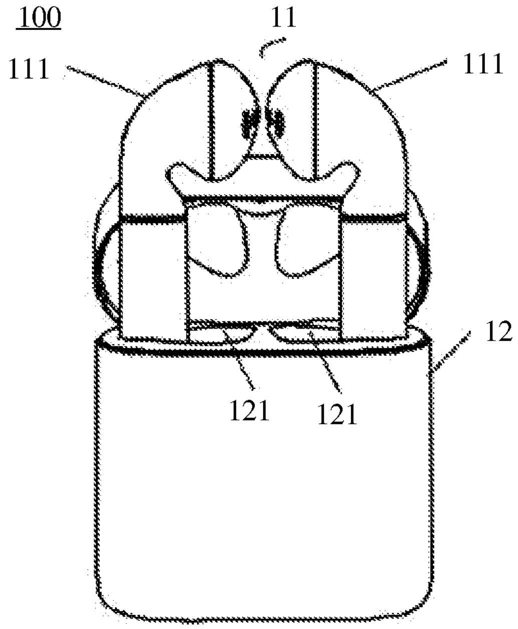
FIG. 2*a* is a schematic diagram of a product form of both a wireless headset and a case according to an embodiment of this application.

FIG. 2*a* is a schematic diagram of a wireless headset system according to an embodiment of this application. As shown in FIG. 2*a*, the wireless headset system 100 may include a wireless headset 11 and a case 12.

The wireless headset 11 includes a pair of headset bodies that can be used in cooperation with a left ear and a right ear of a user, for example, a pair of headset bodies 111. The wireless headset 11 may be specifically an earbud, a supra-aural earphone, an in-ear earphone, or the like. For example, the wireless headset 101 may be a true wireless stereo (true wireless stereo, TWS) earphone. For example, the case 12 is a headset case, and is configured to accommodate the headset bodies 111. For example, the case 12 includes two accommodation compartments 121. The accommodation compartments 121 are configured to accommodate the headset bodies 111.

Figure 2B:
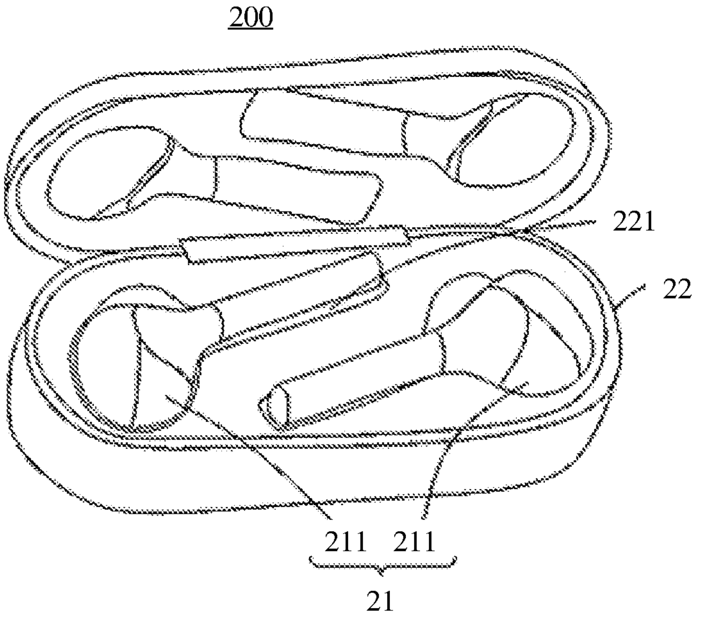
FIG. 2*b* is another schematic diagram of a product form of both a wireless headset and a case according to an embodiment of this application.

It should be noted that FIG. 2*a* is only a schematic diagram of an example of a product form instance of the wireless headset system. The wireless headset provided in this embodiment of this application includes but is not limited to the wireless headset 11 shown in FIG. 2*a*, and the case includes but is not limited to the case 12 shown in FIG. 2*a*. For example, the wireless headset system provided in this embodiment of this application may alternatively be a wireless headset system 200 shown in FIG. 2*b*. As shown in FIG. 2*b*, the wireless headset system 200 includes a wireless headset 21 and a case 22. The wireless headset 21 includes two headset bodies 211. The case 22 includes an accommodation compartment 221 configured to receive the headset bodies 211. Certainly, in some embodiments, the wireless headset may alternatively include only one headset body. Details are not described one by one in this embodiment of this application.

Figure 3:
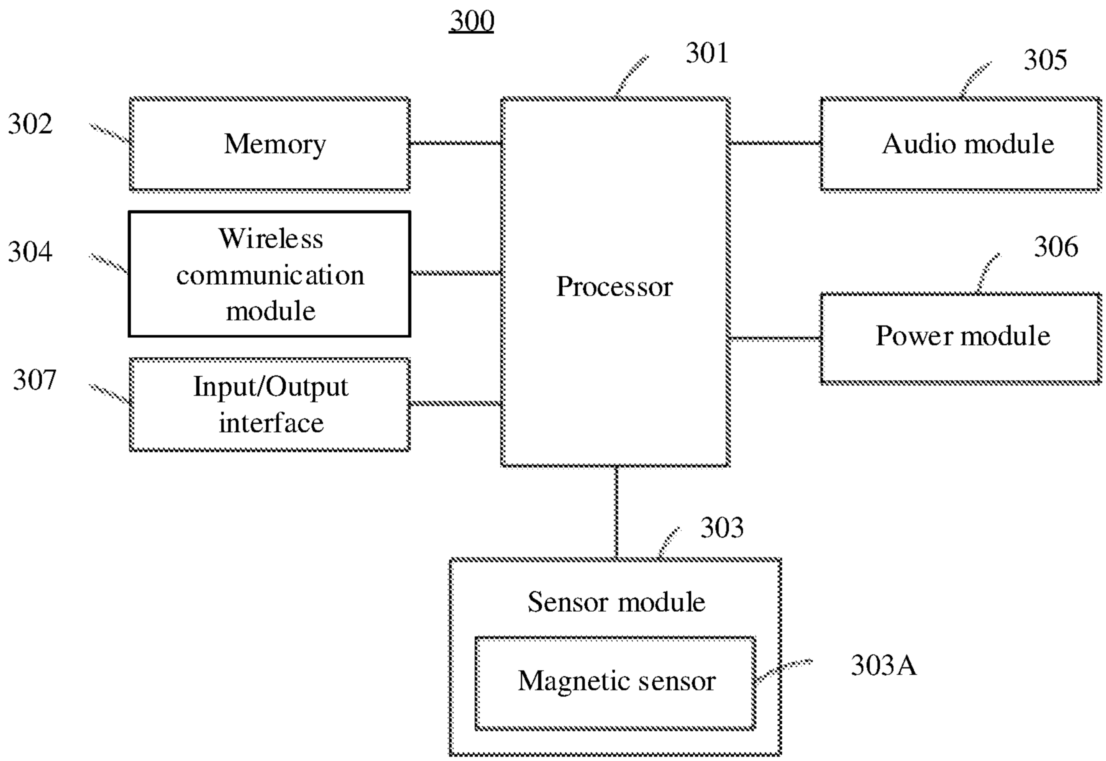
FIG. 3 is a schematic diagram of a hardware structure of a headset body of a wireless headset according to an embodiment of this application.

FIG. 3 is a schematic diagram of a structure of a headset body 300 of a wireless headset. The headset body 300 may be accommodated by a case. The headset body 300 may include a processor 301, a memory 302, a sensor module 303, a wireless communication module 304, an audio module 305, a power module 306, a plurality of input/output interfaces 307, and the like.

The processor 301 may include one or more interfaces, configured to connect to another component in the headset body 300. The one or more interfaces may include an IO interface (also referred to as an IO pin), an interruption pin, a data bus interface, and the like. The data bus interface may include one or more of an SPI interface, an I2C interface, and an I3C interface. For example, in this embodiment of this application, the processor 301 may be connected to a magnetic sensor by using the IO pin, the interruption pin, or the data bus interface.

The memory 302 may be configured to store program code, for example, program code used to charge the headset body 300, perform wireless pairing and connection between the headset body 300 and another electronic device, or perform wireless communication between the headset body 300 and an electronic device. The memory 302 may further store a Bluetooth address used to uniquely identify the wireless headset. In addition, the memory 302 may further store connection data of an electronic device successfully paired with the wireless headset. For example, the connection data may be a Bluetooth address of the electronic device successfully paired with the wireless headset. Based on the connection data, the wireless headset can be automatically paired with the electronic device, and a connection between the wireless headset and the electronic device does not need to be configured. For example, validity verification is not needed. The Bluetooth addresses may be media access control (media access control, MAC) addresses. The processor 301 may be configured to execute the foregoing application code, and invoke related modules to implement functions of the headset body 300 in this embodiment of this application. For example, a charging function, a wireless communication function, an audio data playing function, and a position/status information detection function (for example, a state in which the case is open or closed, and a state in which the headset is placed in the case or out of the case) of the headset body 300 are implemented. The processor 301 may include one or more processing units. Different processing units may be independent components, or may be integrated into one or more processors 301. The processor 301 may be specifically an integrated control chip, or may include a circuit including various active components and/or passive components, and the circuit is configured to perform a function that is of the processor 301 and that is described in embodiments of this application. The processor of the headset body 300 may be a microprocessor.

The sensor module 303 includes a magnetic sensor 303A. The magnetic sensor 303A is configured to detect a magnetic field around the headset body 300. The processor 301 may perform the method in this embodiment of this application, and detect a plurality of states of the headset body 300 based on a magnetic field change detected by the magnetic sensor 303A, for example, the state in which the headset is placed in the case or out of the case, and the state in which the case is open or closed. For example, the magnetic sensor 303A is a three-axis Hall effect sensor.

It should be understood that, in another embodiment, the sensor module 303 may further include another sensor. This is not limited herein. For example, the sensor module 303 further includes a distance sensor and/or an optical proximity sensor. The processor 301 may determine, based on data collected by the distance sensor or the optical proximity sensor, whether the headset body 300 is worn by a user. For example, the processor 301 may detect, by using the data collected by the distance sensor, whether there is an object near the headset body 300, to determine whether the headset body 300 is worn by the user. When determining that the headset body 300 is worn, the processor 301 may turn on a speaker of the headset body 300. For another example, the sensor module 303 may further include a bone conduction sensor. The headset body 300 combines with the bone conduction sensor to form a bone conduction earphone. For example, the processor 301 may obtain a voice signal by parsing a vibration signal of a vibrating bone of a vocal-cord part obtained by the bone conduction sensor, to implement a voice function. For another example, the sensor module 303 further includes a touch sensor, a fingerprint sensor, an ambient light sensor, and/or some other sensors. For example, the touch sensor is disposed on an outer surface of the headset body 300, and is configured to detect a touch operation of the user. The fingerprint sensor is configured to detect a user fingerprint, identify a user identity, and the like. The ambient light sensor may adaptively adjust some parameters (for example, volume) based on sensed ambient light brightness.

The wireless communication module 304 may be configured to support data exchange of wireless communication between the headset body 300 and another electronic device or the case, including Bluetooth (Bluetooth, BT), a global navigation satellite system (global navigation satellite system, GNSS), a wireless local area network (wireless local area network, WLAN) (for example, a wireless fidelity (wireless fidelity, Wi-Fi) network), frequency modulation (frequency modulation, FM), a near-distance wireless communication technology (near field communication, NFC), and an infrared (infrared, IR) technology. For example, the wireless communication module 304 may be a Bluetooth chip. The headset body 300 may be paired with a Bluetooth chip of another electronic device by using the Bluetooth chip, and establish a wireless connection, to implement wireless communication between the headset body 300 and the another electronic device through the wireless connection. For example, in this embodiment of this application, the wireless communication module 304 may be configured to: after the processor 301 determines that the headset body 300 is out of the case, send a remaining battery level of the case to an electronic device that establishes a wireless connection (for example, a Bluetooth connection) with the headset body 300.

In addition, the wireless communication module 304 may further include an antenna. The wireless communication module 304 receives an electromagnetic wave through the antenna, performs frequency modulation and filtering processing on an electromagnetic wave signal, and sends a processed signal to the processor 301. The wireless communication module 304 may further receive a to-be-sent signal from the processor 301, perform frequency modulation and amplification on the signal, and convert the signal into an electromagnetic wave for radiation through the antenna.

The audio module 305 may be configured to manage audio data, so that the headset body 300 inputs and outputs an audio signal. For example, the audio module 305 may obtain the audio signal from the wireless communication module 304, or transfer the audio signal to the wireless communication module 304, to implement, by using the headset body 300, functions such as answering/making a call, playing music, enabling/disabling a voice assistant of an electronic device connected to the headset, and receiving/sending voice data of the user. The audio module 305 may include a speaker (or referred to as an earpiece or a receiver) component configured to output the audio signal, a microphone (or referred to as a mike), a microphone radio circuit cooperating with the microphone, and the like. The speaker may be configured to convert an audio electrical signal into a sound signal and play the sound signal. The microphone may be configured to convert a sound signal into an audio electrical signal. The audio module 305 (for example, the speaker, also referred to as a "loudspeaker") includes a magnet (for example, magnetic iron). A magnetic field around the headset body 300 includes a magnetic field generated by the magnet. The magnetic field generated by the magnet affects a magnitude of magnetic induction intensity collected by the magnetic sensor 303A of the headset body 300.

The power module 306 may be configured to provide system power of the headset body 300 to supply power to each module of the headset body 300. The power module 306 is further configured to support the headset body 300 in receiving charging input and the like. The power module 306 may include a power management unit (power management unit, PMU) and a battery (that is, a first battery). The power management unit may include a charging circuit, a voltage drop adjustment circuit, a protection circuit, a power measurement circuit, and the like. The charging circuit may receive an external charging input. The voltage drop adjustment circuit may perform voltage transformation on an electrical signal input by the charging circuit, and provide a transformed electrical signal to the battery to complete battery charging, and may further perform voltage transformation on an electrical signal provided by the battery, and provide a transformed electrical signal to another module such as the audio module 305 and the wireless communication module 304. The protection circuit may be used to prevent the battery from being overcharged, overdischarged, or short-circuited, or causing overcurrent, or the like. In some embodiments, the power module 306 may further include a wireless charging coil, configured to wirelessly charge the headset body 300. In addition, the power management unit may be further configured to monitor parameters such as a battery capacity, a battery cycle count, and a battery health status (electric leakage or impedance).

The plurality of input/output interfaces 307 may be configured to provide a wired connection for charging or communication between the headset body 300 and the case. For example, the input/output interface 307 may include a headset electrical connector. The headset electrical connector is configured to conduct and transmit a current. When the headset body 300 is placed in an accommodation compartment of the case, the headset body 300 may establish an electrical connection to an electrical connector in the case through the headset electrical connector (for example, the headset electrical connector is in direct contact with the electrical connector in the case). After the electrical connection is established, the headset case may charge the battery in the headset body 300 by using a current transmission function of the headset electrical connector and the electrical connector in the case. For example, the headset electrical connector may be a pogo pin, a spring pin, an elastic sheet, a conductive block, a conductive patch, a conductive plate, a pin, a plug, a contact pad, a jack, a socket, or the like. A specific type of the electrical connector is not limited in this embodiment of this application. In some other embodiments, after the electrical connection is established, the headset body 300 may further perform data communication with the headset case, for example, may receive a pairing instruction from the headset case.

It may be understood that the structure shown in this embodiment of this application constitutes no specific limitation on the headset body 300. The headset body may have more or fewer components than those shown in FIG. 3, or combine two or more components, or have different component configurations. For example, a housing of the headset body 300 may be further provided with a magnet (for example, magnetic iron) that is configured to adsorb to the case, so that the headset body 300 is accommodated in the case. A magnetic field around the headset body 300 includes a magnetic field generated by the magnet. The magnetic field generated by the magnet affects a magnetic field vector (including both intensity/a magnitude of a magnetic field and a magnetic field direction) collected by the magnetic sensor 303A of the headset body 300. For another example, an outer surface of the headset body 300 may further include components such as a button, an indicator light (which may indicate a battery level, an incoming/outgoing call, a pairing mode, and the like), a display (which may prompt user-related information), and a dust filter (which may be used in cooperation with the earpiece). The button may be a physical button, a touch button (used in cooperation with the touch sensor), or the like, and is configured to trigger operations such as power-on, power-off, pause, play, record, start charging, and stop charging.

Figure 4:
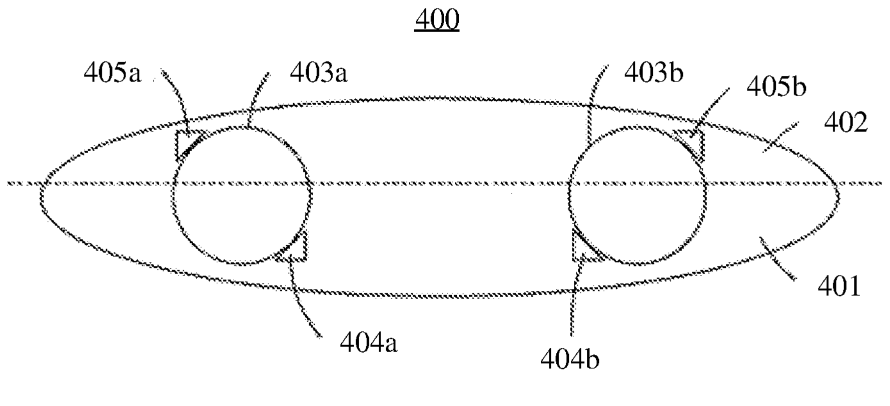
FIG. 4 is a schematic diagram of a product form of a case for a wireless headset according to an embodiment of this application.

FIG. 4 is a schematic diagram of a structure of a case 400 of a wireless headset. The case 400 may be configured to accommodate a headset body. The case 400 may include a lower cover 401 and an upper cover 402. The lower cover 401 and the upper cover 402 may be joined together, to accommodate the headset body. For example, the case 400 includes two accommodation compartments 403*a* and 403*b*. Each of the two accommodation compartments 403*a* and 403*b* is configured to accommodate a corresponding headset body.

It may be understood that, in some embodiments, the case 400 may have one or more magnets. For example, the one or more magnets may include a first magnet and a second magnet. The first magnet and the second magnet are disposed corresponding to a magnetic sensor of the wireless headset, so that when the wireless headset is placed in the case, the magnetic sensor of the wireless headset can sense vectors generated by both the first magnet and the second magnet. The first magnet is disposed on an upper cover 402, and the second magnet is disposed on a lower cover 401, and both the first magnet and the second magnet correspond to the magnetic sensor of the wireless headset. For example, the first magnet and the second magnet are respectively disposed on the upper cover 402 and the lower cover 401, and are respectively disposed corresponding to the accommodation compartments 403*a* and 403*b* of the case 400. In this case, when headset bodies are accommodated in the accommodation compartments 403*a* and 403*b* of the case 400, a magnetic field around the headset body includes at least magnetic fields generated by both the first magnet and the second magnet. The magnetic fields generated by both the first magnet and the second magnet affect a magnetic field vector collected by the magnetic sensor of the headset body.

It may be understood that, in this embodiment of this application, parameters such as a quantity, a shape, and a size of both the first magnet and the second magnet are not limited. For example, as shown in FIG. 4, one first magnet and one second magnet may be correspondingly disposed in the case 400 for each headset body. For example, a first magnet 405*a* and a second magnet 404*a* are disposed for a headset body corresponding to the left-side accommodation compartment 403*a*, and a first magnet 405*b* and a second magnet 404*b* are disposed for a headset body corresponding to the right-side accommodation compartment 403*b*. Certainly, quantities of first magnets and second magnets that are disposed in the case 400 for each headset body may be adjusted based on a specific situation, provided that magnetic fields generated by both the first magnet and the second magnet affect the magnetic field vector collected by the magnetic sensor of the headset body. For example, in another embodiment, the case 400 may correspondingly dispose two or more first magnets and two or more second magnets for each headset body.

It may be understood that, in this embodiment of this application, specific arrangement positions of the first magnet and the second magnet are not limited either. For example, the first magnet and the second magnet may be alternatively disposed between the two accommodation compartments 403*a* and 403*b*, so that the two headset bodies may share a same first magnet and a same second magnet. For example, in one embodiment, one first magnet and one second magnet may be disposed. The first magnet and the second magnet are disposed in a middle position between the two headset bodies or another appropriate position, so that magnetic sensors in the two headset bodies can both collect magnetic fields generated by both the first magnet and the second magnet.

It may be understood that, in this embodiment of this application, the second magnet may be omitted from the case 400, in other words, the first magnet is disposed only on the upper cover 402, provided that a magnetic field generated by the first magnet affects the magnetic field vector collected by the magnetic sensor of the headset body.

It may be understood that, in this embodiment of this application, the case 400 may further have one or more other magnets, for example, a magnet configured to adsorb the wireless headset (for example, the headset body of the wireless headset), so that the wireless headset is accommodated in the accommodation compartments 403*a* and 403*b*; and/or a magnet configured to implement closure and adsorption of both the lower cover 401 and the upper cover 402 of the case 400, and the like, which is not limited herein.

It may be understood that in this embodiment of this application, the case 400 may further include a case power module and a plurality of input/output interfaces. The case power module may supply power to an electrical component in the case 400, and the case power module may include a case battery (that is, a second battery). In some embodiments, the input/output interface may be a case electrical connector. The case electrical connector is electrically connected to an electrode of the case power module, and may be configured to conduct and transmit a current. For example, the case 400 may include two pairs of case electrical connectors respectively corresponding to the two headset bodies. After a pair of case electrical connectors in the case 400 respectively establish electrical connections to two headset electrical connectors in the headset body, the case 400 may charge a battery in the headset body by using the case battery of the case.

It may be understood that, in some other embodiments, at least one touch control may be further disposed on the case 400, and may be configured to trigger a function such as pairing and resetting, or charging of the wireless headset. One or more battery level indicators may be further disposed in the case 400, to prompt a user of both a power level of the battery in the case 400 and a power level of a battery in each headset body in the case 400.

It may be understood that, in some other embodiments, the case 400 may further include components such as a processor, a memory, a charging interface, and a wireless charging coil. Details are not described herein.

Both a wireless headset and a position/status information detection method for the wireless headset in the following embodiments may be implemented in the wireless headset having the foregoing hardware structure. For example, the following separately uses Embodiment 1 and Embodiment 2 as examples to describe implementations of embodiments of this application with reference to the accompanying drawings.

Embodiment 1

Figure 5A:
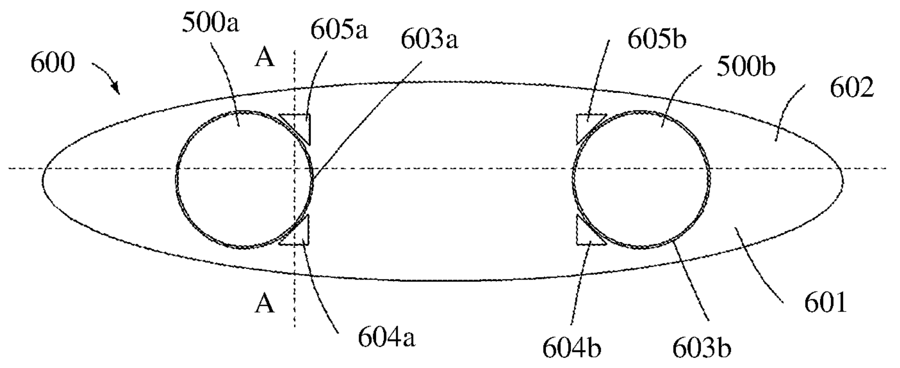
FIG. 5*a* is a schematic diagram of a wireless headset in a state in which a case is closed and the headset is placed in the case according to an embodiment of this application.
Figure 5B:
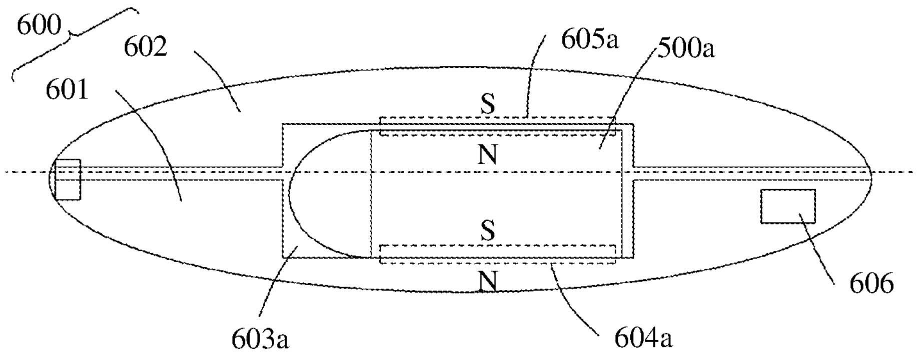
FIG. 5*b* is a schematic diagram of a wireless headset at another angle in a state in which a case is closed and the headset is placed in the case according to an embodiment of this application.
Figure 5C:
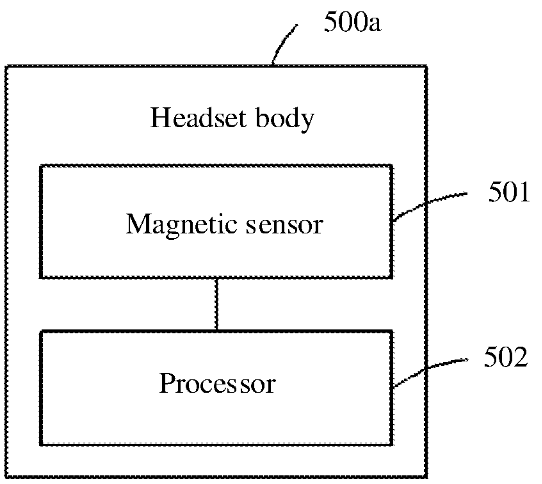
FIG. 5*c* is a schematic diagram of a hardware structure of a headset body of a wireless headset according to an embodiment of this application.
Figure 5D:
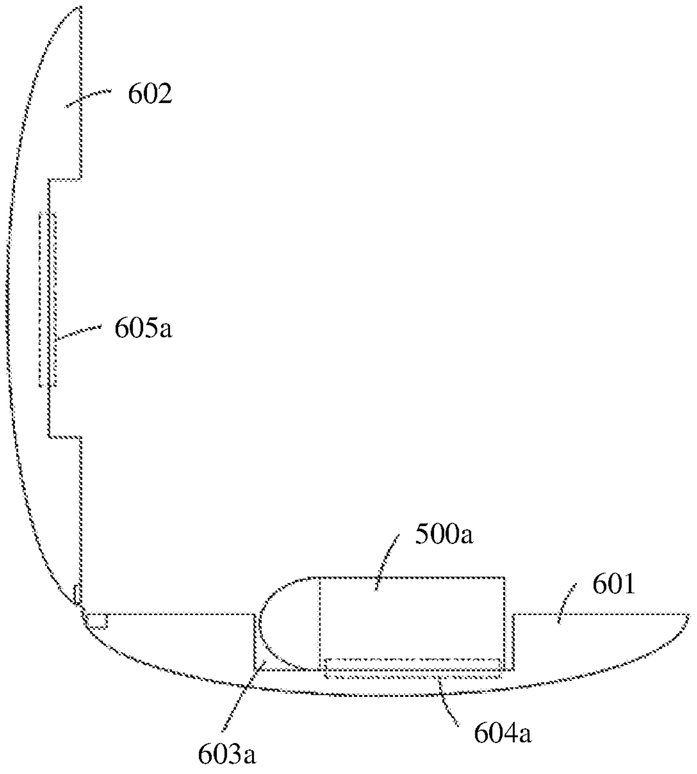
FIG. 5*d* is a schematic diagram of a wireless headset in a state in which a case is open and the headset is placed in the case according to an embodiment of this application.
Figure 5E:
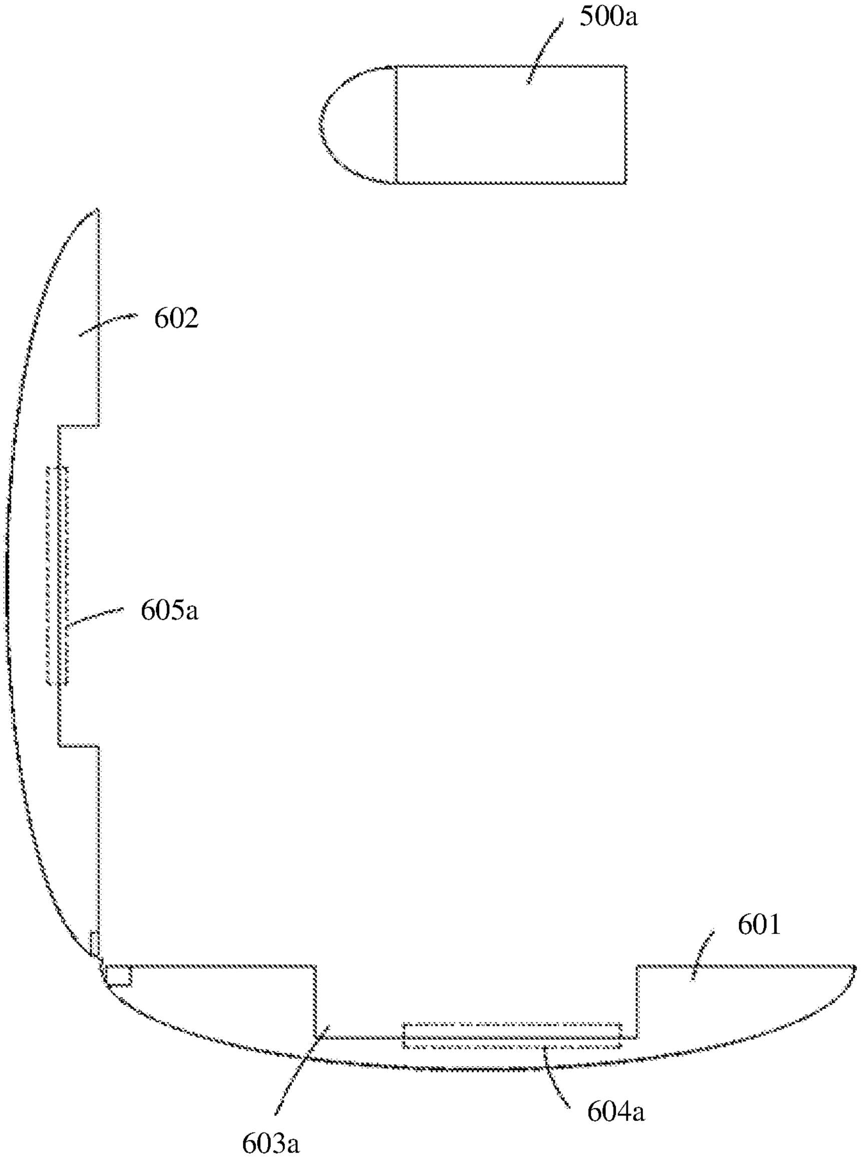
FIG. 5*e* is a schematic diagram of a wireless headset in an out-of-case state according to an embodiment of this application.
Figure 5F:
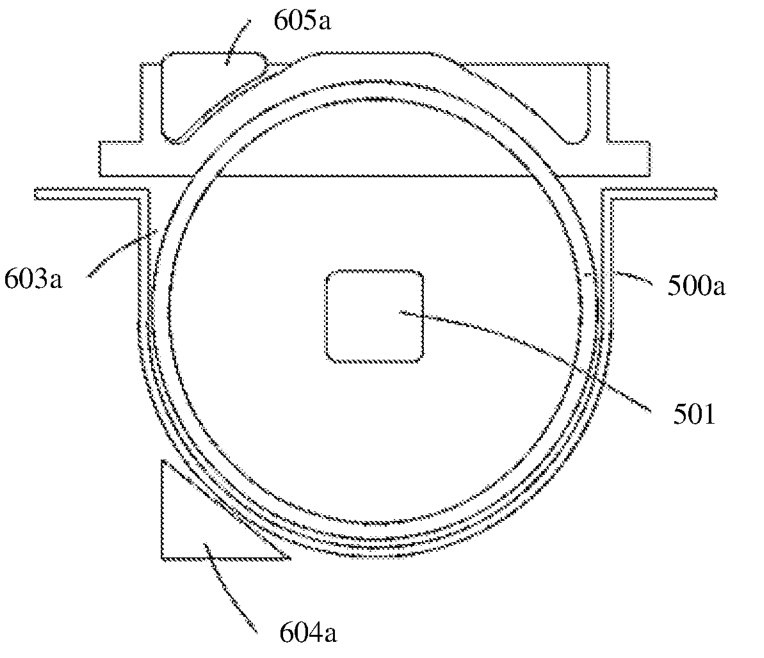
FIG. 5*f* is a schematic diagram of a position of a magnetic sensor in a wireless headset according to an embodiment of this application.

Embodiment 1 of this application provides a wireless headset. Refer to FIG. 5*a* to FIG. 5*f*. FIG. 5*a* is a schematic diagram of a wireless headset that is placed in a case. FIG. 5*b* is a side sectional view of the wireless headset shown in FIG. 5*a* along an A-A line after the wireless headset is placed in the headset case. FIG. 5*c* is a schematic diagram of a hardware structure of a headset body of the wireless headset shown in FIG. 5*a*. FIG. 5*d* is a schematic diagram of the wireless headset shown in FIG. 5*a* in a state in which a case is open and the headset is placed in the case. FIG. 5*e* is a schematic diagram of the wireless headset shown in FIG. 5*a* in an out-of-case state. FIG. 5*f* is a schematic diagram of a position of a magnetic sensor in the wireless headset shown in FIG. 5*a*.

The wireless headset includes two headset bodies 500*a* and 500*b*. The two headset bodies 500*a* and 500*b* are accommodated in the case 600. As shown in FIG. 5*a* to FIG. 5*d*, the case 600 includes a lower cover 601 and an upper cover 602. The lower cover 601 and the upper cover 602 may be joined together, to accommodate the headset bodies 500*a* and 500*b*. For example, the case 600 includes two accommodation compartments 603*a* and 603*b*. Each of the two accommodation compartments 603*a* and 603*b* is configured to accommodate a corresponding headset body. For example, the accommodation compartment 603*a* is configured to accommodate the headset body 500*a*, and the accommodation compartment 603*b* is configured to accommodate the headset body 500*b*.

For example, in this embodiment of this application, both a first magnet and a second magnet are disposed corresponding to each of the headset bodies 500*a* and 500*b* in the case 600. For example, both a first magnet 605*a* and a second magnet 604*a* are disposed corresponding to the headset body 500*a*, and both a first magnet 605*b* and a second magnet 604*b* are disposed corresponding to the headset body 500*b*. It may be understood that, for ease of description, the following embodiments uses the accommodation compartment 603*a*, the headset body 500*a*, the first magnet 605*a*, and the second magnet 604*a* on the left as examples for description.

The first magnet 605*a* is disposed on the upper cover 602, and the second magnet 604*a* is disposed on the lower cover 601. Both the first magnet 605*a* and the second magnet 604*a* correspond to the headset body 500*a*. For example, the first magnet 605*a* and the second magnet 604*a* are respectively disposed on the upper cover 602 and the lower cover 601, and are disposed corresponding to the accommodation compartment 603*a* of the case 600. In this case, when the headset body 500*a* is accommodated in the accommodation compartment 603*a*, a magnetic field around the headset body 500*a* includes at least magnetic fields generated by both the first magnet 605*a* and the second magnet 604*a*. The magnetic fields generated by both the first magnet 605*a* and the second magnet 604*a* affect a magnetic field vector collected by a magnetic sensor (described in detail below) of the headset body 500*a*.

It may be understood that, in this embodiment of this application, positions of both the first magnet 605*a* and the second magnet 604*a* relative to the headset body 500*a* are not limited. For example, as shown in FIG. 5*a*, the first magnet 605*a* and the second magnet 604*a* on the left may be axially symmetric relative to the headset body 500*a* on the left.

For another example, as shown in FIG. 5*b*, an adsorption magnet 606 is further disposed on the case 600. The adsorption magnet 606 is configured to implement closure and adsorption of both the lower cover 601 and the upper cover 602 of the case 600. In this embodiment of this application, a specific position of the adsorption magnet 606 on the case 600 is not limited. For example, the adsorption magnet 606 may be disposed on the lower cover 601 or the upper cover 602. Correspondingly, a corresponding magnet, a corresponding soft magnet, and the like are disposed on the upper cover 602 or the lower cover 601, to cooperate with the adsorption magnet 606 to implement closure and adsorption of both the lower cover 601 and the upper cover 602. For another example, the adsorption magnet 606 may be disposed at a position away from the accommodation compartment 603 on the case 600, so that interference caused by a magnetic field generated by the adsorption magnet 606 to magnetic induction intensity collected by the magnetic sensor of the headset body 500 can be prevented.

It may be understood that, in this embodiment of this application, a type, a shape, and the like of the headset body 500*a* are not limited. For example, the headset body 500*a* may be an earbud, a supra-aural earphone, an in-ear earphone, or the like. For another example, the headset body 500*a* may be in a cylindrical shape or in a cylindrical-like shape (for example, a bullet-like shape), or the like (referring to FIG. 5*b*). It may be understood that, when the headset body 500*a* is in the cylindrical shape or in the cylindrical-like shape, the headset body 500*a* may freely rotate in the accommodation compartment 603*a* of the case 600. A position at which the headset body 500*a* rotates in the accommodation compartment 603*a* of the case 600 does not affect detection of a headset status by the three-axis Hall effect sensor in the headset body 500*a*, including an in-case state, an out-of-case state, an open state, and a closed state. That the headset body 500*a* can rotate freely means that the headset body 500*a* can rotate at a specific angle (for example, 45 degrees) or implement 360-degree rotation in the accommodation compartment 603*a*.

Refer to FIG. 5*c*. The headset body 500*a* may include the magnetic sensor 501 and a processor 502. The magnetic sensor 501 is coupled to the processor 502. It may be understood that, when the headset body 500*a* is the headset body 300 shown in FIG. 3, the magnetic sensor 501 may be the magnetic sensor 303A shown in FIG. 3, and the processor 502 may be the processor 301 shown in FIG. 3. For functions, a connection relationship, and the like of the magnetic sensor 501 and the processor 502, refer to the embodiment shown in FIG. 3. Details are not described herein again.

It may be understood that, in this embodiment of this application, the magnetic sensor 501 is a three-axis Hall effect sensor, and is configured to detect a magnetic field vector (for example, magnitudes of magnetic fields on an x-axis, a y-axis, and a z-axis) around the headset body 500, and transmit the detected magnetic field vector to the processor 502.

For example, when the headset body 500*a* is accommodated in the accommodation compartment 603*a* of the case 600, and the case 600 is closed (referring to FIG. 5*a* and FIG. 5*b*), a magnetic field around the headset body 500*a* may include at least a magnetic field generated by a magnet in the headset body 500*a* and a magnetic field generated by the case 600, that is, a combined magnetic field generated by both the magnet in the headset body 500*a* and a magnet in the case 600. For example, the magnetic field generated by the magnet in the headset body 500*a* may include a magnetic field generated by a magnet in a speaker (also referred to as a "loudspeaker"). The magnetic field generated by the case 600 includes at least a magnetic field generated by the first magnet 605*a* and a magnetic field generated by the second magnet 604*a*.

Optionally, the magnetic field generated by the magnet in the headset body 500*a* may further include a magnetic field generated by the magnet that is configured to adsorb to the case 600, so that the headset body 500*a* is accommodated in the accommodation compartment 603*a* of the case 600. The magnetic field generated by the case 600 may further include a magnetic field generated by the adsorption magnet 606 that is configured to implement closure and adsorption of both the lower cover 601 and the upper cover 602. Optionally, the magnetic field generated by the case 600 may further include: a magnetic field generated by a magnet that is configured to adsorb the headset body 500*a*, so that the headset body 500*a* is accommodated in the accommodation compartment 603*a* of the case 600, and a magnetic field generated by a magnet that is configured to increase pressure of a charging pin of the case 600 and the headset body 500*a*, and the like. The charging pin of the case 600 and the headset body 500*a* may be an electrical connector between the case 600 and the headset body 500*a*.

Similarly, refer to FIG. 5*d*. When the headset body 500*a* is accommodated in the accommodation compartment 603*a* of the case 600, and the case 600 is open, a magnetic field around the headset body 500*a* may include at least a magnetic field generated by a magnet in the headset body 500*a* and a magnetic field generated by the case 600, in other words, a combined magnetic field generated by both the magnet in the headset body 500*a* and a magnet in the case 600.

Refer to FIG. 5*e*. When the headset body 500*a* is out of the case 600, the magnetic field around the headset body 500*a* may include a magnetic field generated by a magnet in the headset body 500*a*.

Certainly, when the headset body 500*a* is out of the case 600, but a distance between the headset body 500*a* and the case 600 is relatively short, a magnet in the case 600 also affects the magnetic field around the headset body 500*a*. In comparison with the in-case state (including a state in which the case is closed and the headset is placed in the case and a state in which a case is open and the headset is placed in the case), when the headset body 500*a* is in the out-of-case state, the magnet in the case 600 has less impact on the magnetic field around the headset body 500*a*, and the impact may be ignored. In this embodiment of this application, for ease of description, when the headset body 500*a* is in the out-of-case state, the impact of the magnet in the case 600 on the magnetic field around the headset body 500*a* is ignored.

In conclusion, when the headset body 500*a* is in the state in which the case is open and the headset is placed in the case, the magnetic sensor 501 may detect a combined magnetic field vector (referred to as a first magnetic field vector) generated by both the magnet in the headset body 500*a* and the magnet in the case 600. When the headset body 500*a* is in the state in which the case is open and the headset is placed in the case, the magnetic sensor 501 may also detect a combined magnetic field vector (referred to as a second magnetic field vector) generated by both the magnet in the headset body 500*a* and the magnet in the case 600. When the headset body 500*a* is in the out-of-case state, the magnetic sensor 501 may detect a magnetic field vector (referred to as a third magnetic field vector) generated by the magnet in the headset body 500*a*.

It may be understood that, when the headset body 500*a* is in the state in which the case is open and the headset is placed in the case, because the upper cover 602 is open, impact of the magnet on the upper cover 602 on the headset body 500*a* in the state in which the case is open and the headset is placed in the case is less than impact of the magnet on the upper cover 602 on the headset body 500*a* in the state in which the case is closed and the headset is placed in the case. In other words, the first magnetic field vector is different from the second magnetic field vector. In addition, when the headset body 500*a* is in the out-of-case state, the magnetic sensor 501 can detect only the magnetic field vector generated by the magnet in the headset body 500*a*. Therefore, the third magnetic field vector is also different from the first magnetic field vector and the second magnetic field vector.

It can be learned that, when the headset body 500*a* is in different states (for example, the state in which the case is closed and the headset is placed in the case, the state in which the case is open and the headset is placed in the case, or the out-of-case state), magnetic field vectors detected by the magnetic sensor 501 are different. Therefore, in this embodiment of this application, the wireless headset may detect a corresponding magnetic field vector by using the magnetic sensor 501, and process the magnetic field vector by using the processor 502, to determine or detect the position information of the wireless headset. For example, the wireless headset is in the state in which the case is closed and the headset is placed in the case, the state in which the case is open and the headset is placed in the case, or the out-of-case state.

For example, the processing the magnetic field vector by using the processor 502 may be, but is not limited to, presetting, by the processor 502, different vector thresholds corresponding to different states. In this case, when the processor 502 determines that the magnetic field vector sensed by the magnetic sensor 501 satisfies a preset vector threshold, it indicates that the headset body 500*a* is in a corresponding state. For example, the processor 502 may set that when determining that the magnetic field vector sensed by the magnetic sensor 501 satisfies a first vector threshold, the processor 502 determines that the headset body 500*a* is in the state in which the case is closed and the headset is placed in the case. When determining that the magnetic field vector sensed by the magnetic sensor 501 satisfies a second vector threshold, the processor 502 determines that the headset body 500*a* is in the state in which the case is open and the headset is placed in the case. When determining that the magnetic field vector sensed by the magnetic sensor 501 satisfies a third vector threshold, the processor 502 determines that the headset body 500*a* is in the out-of-case state.

It may be understood that, the wireless headset is provided with the magnetic sensor 501, and the magnetic sensor 501 is a three-axis Hall effect sensor. The magnetic sensor 501 may determine, based on a magnetic field change in each state of the wireless headset, a plurality of complex positions and states, including: the state in which the case is closed and the headset is placed in the case, the state in which the case is open and the headset is placed in the case, or the out-of-case state. This can reduce a requirement of the headset on a magnetic environment and an electrical environment of the case 600, simplify a product design difficulty, and reliably detect statuses of a plurality of headsets relative to the case. In addition, a detection result of the wireless headset is not affected by a problem occurring in an electrical connection mechanism between the case 600 and the headset body 500*a*, or corrosion of an electrical connection pin, which may cause incorrect determining of various position/status information of the wireless headset. In other words, detection of the magnetic induction intensity and the determining of the position/status information may be independent of the case 600, and does not need to depend on an electrical connection relationship between the case 600 and the wireless headset. Even if a problem occurs in the electrical connection mechanism between the case 600 and the wireless headset, or the electrical connection pin is corroded, the wireless headset may timely obtain various position/status information of the wireless headset, and perform a corresponding operation based on the position/status information, for example, control power-on and power-off of the wireless headset, and control automatic pairing between the wireless headset and the electronic device. In addition, the wireless headset is out of the case, so that interference resistance can be further performed from a magnetic environment outside the case, and reliability performance is higher.

It may be understood that, in another embodiment, the wireless headset may further control and implement power-on and power-off of the wireless headset based on the magnetic field vector detected by the magnetic sensor 501. The wireless headset can independently implement power-on and power-off and determine the status of the wireless headset, and does not need to depend on communication with the case 600. This further effectively improves user experience.

Refer to FIG. 5*f*. It may be understood that, for example, the magnetic sensor 501 is disposed at a central axis position of the headset body 500*a*. In this way, a plurality of types of position/status information can be detected by using the magnetic sensor 501 without identifying a placement direction of the headset body 500*a*, and a left headset and a right headset. In addition, the magnetic sensor 501 is disposed as a three-axis Hall effect sensor, and the magnetic sensor 501 is disposed at the central axis position of the headset body 500*a*. In this way, when the headset body 500*a* freely rotates in the accommodation compartment 603, the foregoing position/status information can also be accurately detected. Certainly, in another embodiment, a position of the magnetic sensor 501 is not limited thereto, and may be further adjusted based on an actual situation, which is not limited herein.

It may be understood that, in this embodiment of this application, to enable a difference in magnetic field vectors detected by the magnetic sensor 501 is more obvious when the headset body 500*a* is in different states (for example, the state in which the case is closed and the headset is placed in the case, the state in which the case is open and the headset is placed in the case, or the out-of-case state), quantities, sizes, and the like of both the first magnet 605 and the second magnet 604 may be adjusted based on a situation, or a plurality of other magnets may be disposed in the case 600.

It may be understood that, in another embodiment, the second magnet 604*a* may alternatively be omitted based on an actual situation. In other words, the first magnet 605*a* is disposed only on the upper cover 602 of the case 600. The headset body 500*a* may alternatively determine or detect the position/status information of the wireless headset by using the first magnet 605*a*.

Clearly, in this embodiment of this application, a magnet, for example, the second magnet 604*a*, is added to the lower cover 601, so that a difference in magnetic field vectors detected by the magnetic sensor 501 is more obvious. This further effectively improves accuracy of status detection of the wireless headset, in other words, the wireless headset has more accurate status detection effect. Further, refer to FIG. 5*b*. If magnet directions of magnets (for example, the first magnet 605*a* and the second magnet 604*a*) on the upper cover 602 and the lower cover 601 are the same, the upper cover 602 and the lower cover 601 can also be effectively closed. This improves tactile experience.

Embodiment 2

Embodiment 2 of this application provides a wireless headset. Refer to FIG. 6*a* to FIG. 6*e*. The wireless headset includes two headset bodies 700*a* and 700*b*. The two headset bodies 700*a* and 700*b* are accommodated in a case 800.

It may be understood that, as shown in FIG. 6*a* to FIG. 6*e*, a difference between Embodiment 2 and Embodiment 1 lies in that, in addition to a first magnet 805*a* and a second magnet 804*a*, a third magnet 807*a* is further disposed corresponding to the headset body 700*a* in the case 800. The third magnet 807*a* is disposed on an upper cover 802, and is configured to adsorb the headset body 700*a* to the upper cover 802. For another example, the third magnet 807*a* may alternatively cooperate with the first magnet 805*a* to adsorb the headset body 700*a* to the upper cover 802. Certainly, in another embodiment, the wireless headset is not limited to adsorbing the headset body 700*a* by using the third magnet 807*a*, and can be provided with another adsorption structure, to adsorb the headset body 700*a* to the upper cover 802.

Figure 6A:
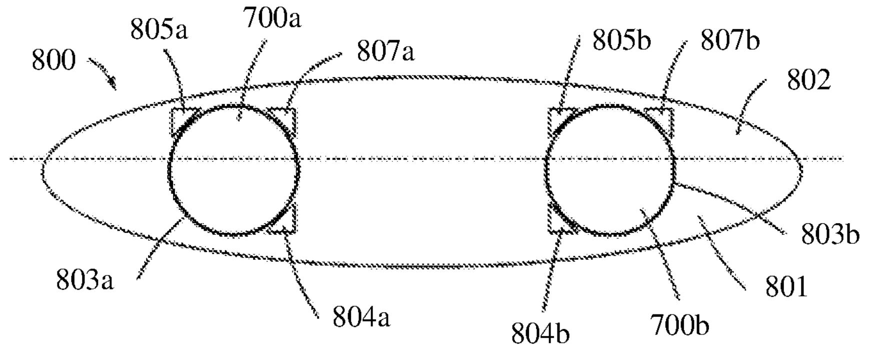
FIG. 6*a* is another schematic diagram of a wireless headset in a state in which a case is closed and the headset is placed in the case according to an embodiment of this application.
Figure 6B:
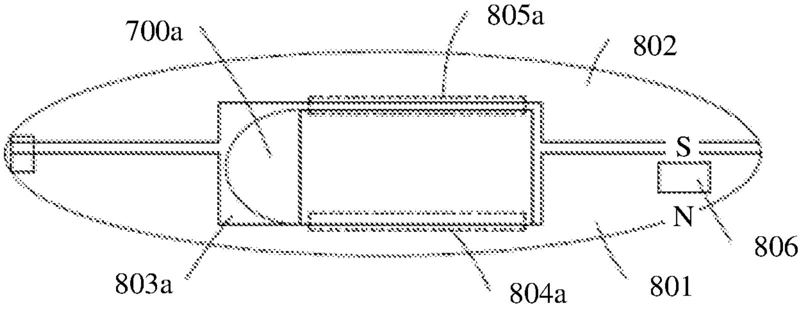
FIG. 6*b* is another schematic diagram of a wireless headset at another angle in a state in which a case is closed and the headset is placed in the case according to an embodiment of this application.
Figure 6C:
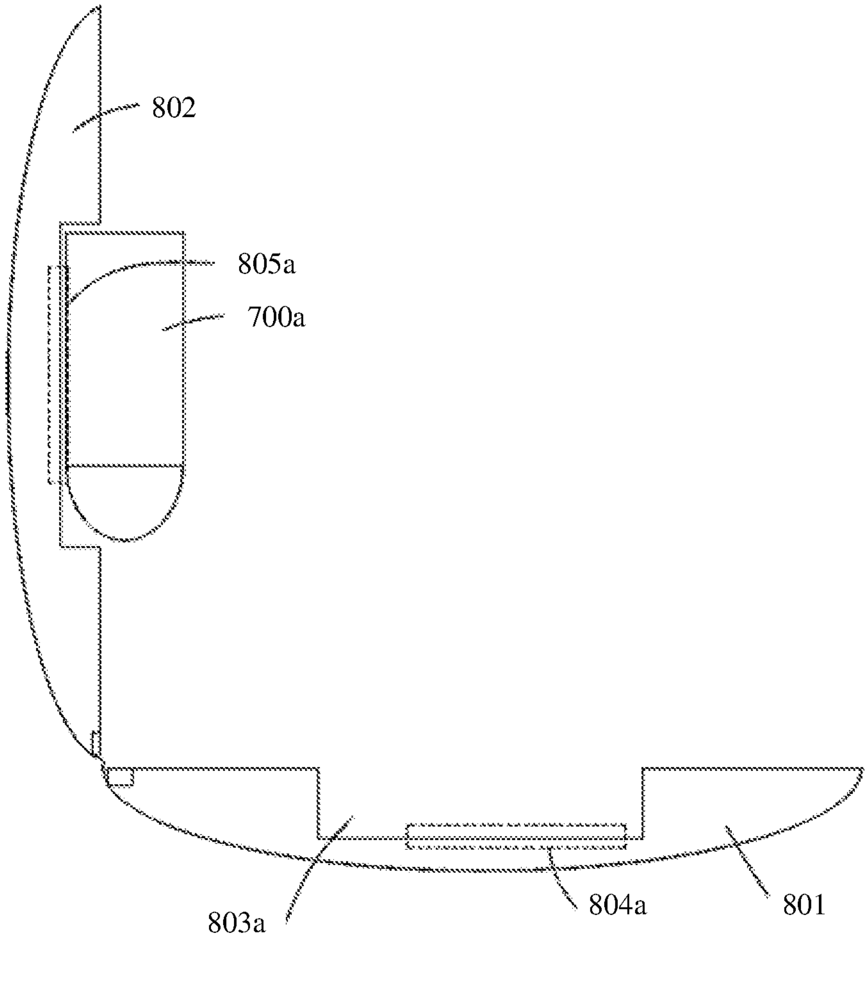
FIG. 6*c* is another schematic diagram of a wireless headset in a state in which a case is open and the headset is placed on an upper cover of the case according to an embodiment of this application.
Figure 6D:
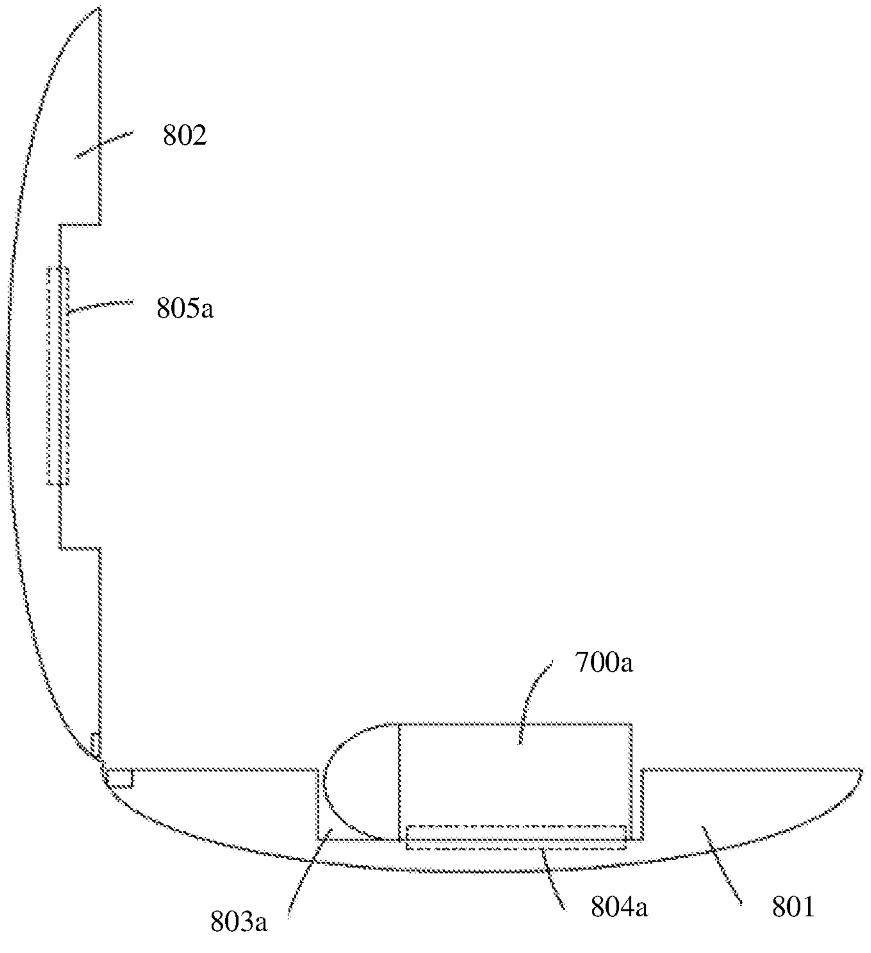
FIG. 6*d* is another schematic diagram of a wireless headset in a state in which a case is open and the headset is placed on a lower cover of the case according to an embodiment of this application.
Figure 6E:
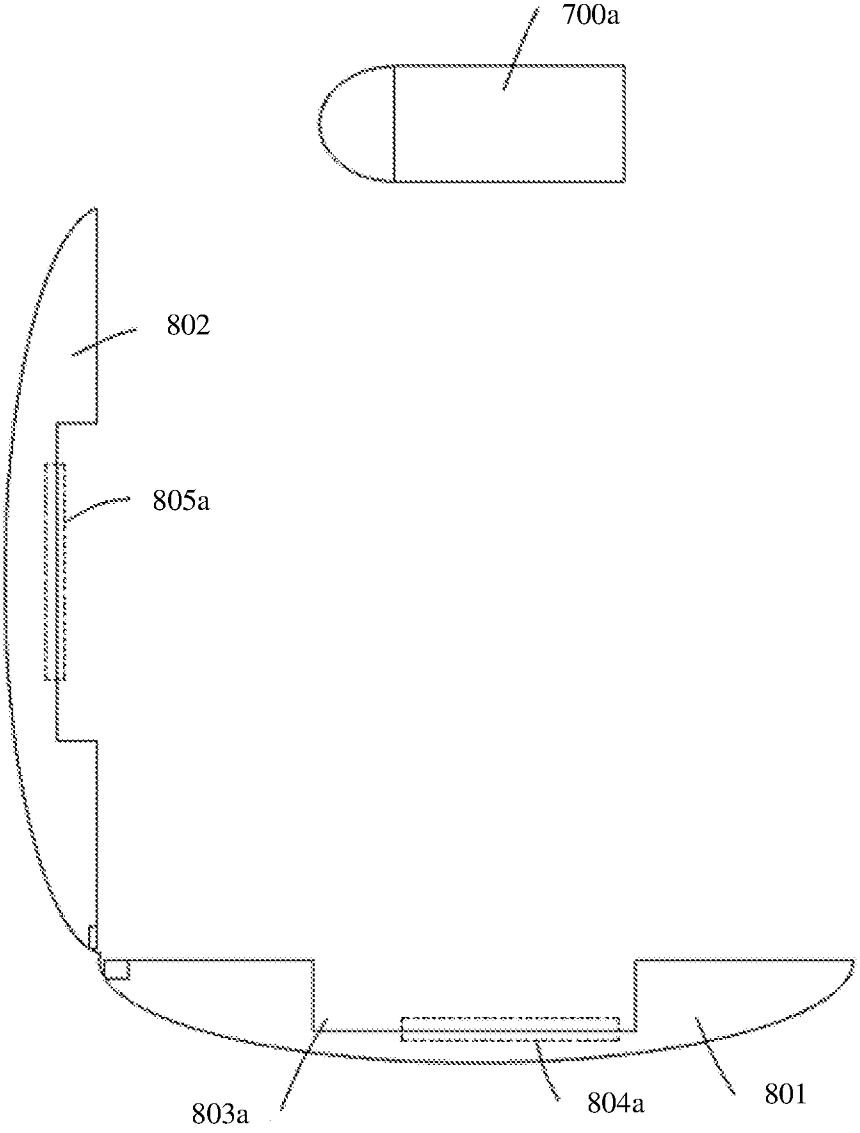
FIG. 6*e* is another schematic diagram of a wireless headset in an out-of-case state according to an embodiment of this application.

It may be understood that, compared with Embodiment 1, Embodiment 2 provides the third magnet 807*a* on the case 800. Therefore, the headset body 700*a* has at least four states: a state in which the case is closed and the headset is placed in the case, a state in which the case is open and the headset is placed in the case (including a state in which the case is open and the headset is placed on the lower cover of the case, and a state in which the case is open and the headset is placed on the upper cover of the case), and an out-of-case state. For example, as shown in FIG. 6*a* and FIG. 6*b*, the headset body 700*a* is in the state in which the case is closed and the headset is placed in the case. As shown in FIG. 6*c*, the headset body 700*a* is in the state in which a case is open and the headset is placed on the upper cover of the case. As shown in FIG. 6*d*, the headset body 700*a* is in the state in which a case is open and the headset is placed on the lower cover of the case. As shown in FIG. 6*e*, the headset body 700*a* is in the out-of-case state.

Similar to Embodiment 1, when the headset body 700*a* is in different states (for example, the state in which the case is closed and the headset is placed in the case, the state in which the case is open and the headset is placed on the lower cover of the case, the state in which the case is open and the headset is placed on the upper cover of the case, or the out-of-case state), magnetic field vectors detected by the headset body 700*a* are different. Therefore, in Embodiment 2, the wireless headset may detect different magnetic field vectors, and process the magnetic field vectors, to determine or detect position/status information of the headset, for example, the headset is in the state in which the case is closed and the headset is placed in the case, the state in which the case is open and the headset is placed on the lower cover of the case, the state in which the case is open and the headset is placed on the upper cover of the case, or the out-of-case state.

It may be understood that, in the foregoing embodiment, the second magnet 804*a* and the third magnet 807*a* are independent magnets, and the second magnet 804*a* and the third magnet 807*a* are disposed at intervals. Certainly, in another embodiment, the first magnet 805*a* and the third magnet 807*a* may alternatively be combined. For example, in Embodiment 1, the first magnet 805*a* and the third magnet 807*a* may be disposed (or connected) together to form an entirety, that is, form a large magnet. For another example, in another embodiment, the third magnet 807*a* may not be disposed, but a size of the first magnet 805*a* is directly adjusted, so that the first magnet 805*a* is disposed to extend to a position of the third magnet 807*a* in the figure, to form a large magnet. In other words, in this embodiment of this application, detection of at least four states may also be implemented by disposing at least two magnets (for example, the first magnet and the second magnet).

It may be understood that other parts of Embodiment 2 are similar to those of Embodiment 1. For details, refer to Embodiment 1. Details are not described herein again.

It may be understood that the foregoing preset vector threshold is described below with reference to Embodiment 1, Embodiment 2, and FIG. 7.

Figure 7:
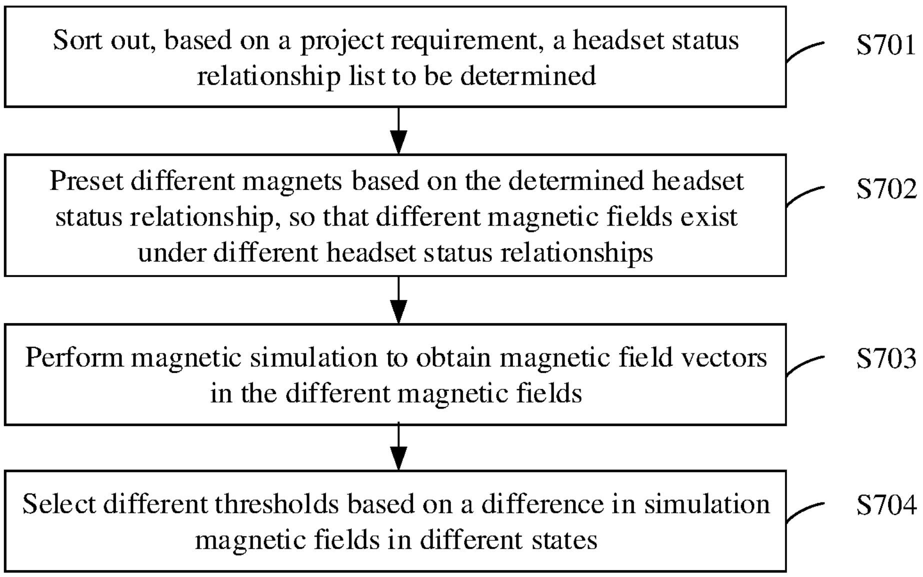
FIG. 7 is a schematic flowchart of obtaining a vector threshold according to an embodiment of this application.

Refer to FIG. 7. First, a headset status relationship list to be determined by a wireless headset may be sorted out based on a project requirement (S701).

For example, when the wireless headset is used in a first-type case (for example, the case 600), the headset status of the wireless headset usually includes: the state in which the case is open and the headset is placed in the case, the state in which the case is closed and the headset is placed in the case, the out-of-case state, and an out-of-case interference state. For another example, when the wireless headset is used in a second-type case (for example, the case 800), the headset status of the wireless headset usually includes: the state in which the case is open and the headset is placed on the lower cover of the case, the state in which the case is open and the headset is placed on the upper cover of the case, the state in which the case is closed and the headset is placed in the case, the out-of-case state, and an out-of-case interference state.

For example, in one embodiment, the headset status may be determined based on whether the case is provided with the third magnet configured to adsorb the headset body to the upper cover. For example, when the case is not provided with the third magnet configured to adsorb the headset body to the upper cover, it indicates that the case is a first-type case shown in Embodiment 1, and the wireless headset includes at least the foregoing four headset states. When the case is provided with the third magnet configured to adsorb the headset body to the upper cover, it indicates that the case is a second-type case shown in Embodiment 2, and the wireless headset includes at least the foregoing five headset states.

Certainly, it may be understood that, with further development of future technologies, more relationships may be required. For example, the case is on a wireless charging dock, and the headset is on a wireless charging dock (the headset supports a wireless charging product). Therefore, for the foregoing fusion product, based on different forms of the fusion body, states to be detected are more diversified. For example, when the headset is fused with a necklace, whether the headset is on the necklace needs to be detected. When the headset is fused with a helmet, whether the headset is inside the helmet needs to be detected. When the headset is fused with glasses, whether the headset is on the glasses needs to be detected. In this embodiment of this application, to simplify description, the foregoing headset states are not limited, and the foregoing four or five common headset states are mainly used as examples for description.

Then, different magnets are preset based on the determined headset status relationship, so that different magnetic fields exist under different headset status relationships (S702).

It may be understood that, due to different complexity of a project, a required quantity of corresponding magnets also varies. For example, when the foregoing four headset states (the state in which the case is open and the headset is placed in the case, the state in which the case is closed and the headset is placed in the case, the out-of-case state, and the out-of-case interference state) are distinguished, two magnets may be respectively placed on the upper cover and the lower cover (for example, referring to Embodiment 1). When the foregoing five headset states (the state in which the case is open and the headset is placed on the lower cover of the case, the state in which the case is open and the headset is placed on the upper cover of the case, the state in which the case is closed and the headset is placed in the case, the out-of-case state, and the out-of-case interference state) are distinguished, at least two magnets may also be disposed. Certainly, to improve adsorption experience, a quantity of magnets may be appropriately adjusted (for example, increased) (for example, referring to Embodiment 2). For another example, when a presence status of a charging dock needs to be checked, a corresponding magnet may also be added to the charging dock as required. For example, a minimum quantity of magnets is three or more, and may be specifically selected based on different quantities of charging docks. For another example, for the fusion product, different magnets need to be added to different fusion bodies for N fusion bodies (different magnetic fields are caused by differences in positions, shapes, and the like), to satisfy detection of a plurality of fusion bodies. It may be understood that another magnetic field that does not satisfy the foregoing status conditions may be considered as out-of-case interference.

Third, magnetic simulation is performed to obtain magnetic field vectors in different magnetic fields (S703).

For example, for Embodiment 1, the first magnet 605*a* and the second magnet 604*a* may be preset, and magnetic simulation is performed, to separately obtain magnetic field vectors in different magnetic fields (for example, the wireless headset is in the state in which the case is closed and the headset is placed in the case, the state in which the case is open and the headset is placed in the case, and the out-of-case state). For another example, for Embodiment 2, the first magnet 805*a*, the second magnet 804*a*, and the third magnet 807*a* may be preset, and magnetic simulation is performed, to separately obtain magnetic field vectors in different magnetic fields (for example, the wireless headset is in the state in which the case is open and the headset is placed in the case, the state in which the case is open and the headset is adsorbed to the lower cover, the state in which the case is open and the headset is adsorbed to the upper cover, and the out-of-case state).

Finally, different vector thresholds are selected based on a difference in a simulation magnetic field of each state (S704).

For example, based on the foregoing descriptions, relationships between various headset states and the vector threshold may be obtained, as shown in Table 1.

TABLE 1

Relationships between magnetic field simulation values and thresholds in various states

| State | Magnetic field (vector) | Simulation theoretical value | Vector threshold |
|---|---|---|---|
| A case is open and a headset is placed on a lower cover of the case | First magnetic field | Obtain a specific magnetic field through project magnetic simulation | Select different thresholds based on a difference in simulation magnetic fields in different states |
| A case is open and a headset is placed on an upper cover of the case | Second magnetic field | Obtain a specific magnetic field through project magnetic simulation | Select different thresholds based on a difference in simulation magnetic fields in different states |
| A case is closed and a headset is placed in the case | Third magnetic field | Obtain a specific magnetic field through project magnetic simulation | Select different thresholds based on a difference in simulation magnetic fields in different states |
| A headset is on a wireless charging dock | Fourth magnetic field | Obtain a specific magnetic field through project magnetic simulation | Select different thresholds based on a difference in simulation magnetic fields in different states |
| A case is open and a headset is placed on a lower cover of the case, and the case is on a wireless charging dock | Fifth magnetic field | Obtain a specific magnetic field through project magnetic simulation | Select different thresholds based on a difference in simulation magnetic fields in different states |
| A case is open and a headset is placed on an upper cover of the case, and the case is on a wireless charging dock | Sixth magnetic field | Obtain a specific magnetic field through project magnetic simulation | Select different thresholds based on a difference in simulation magnetic fields in different states |
| A case is closed and a headset is placed in the case, and the case is on a wireless charging dock | Seventh magnetic field | Obtain a specific magnetic field through project magnetic simulation | Select different thresholds based on a difference in simulation magnetic fields in different states |
| A headset is fused on a fusion body | Ninth magnetic field | Obtain a specific magnetic field through project magnetic simulation | Select different thresholds based on a difference in simulation magnetic fields in different states |
| A headset is out of a case and not on a fusion body | Eighth magnetic field | Obtain a specific magnetic field through project magnetic simulation | Select different thresholds based on a difference in simulation magnetic fields in different states |
| Out-of-case interference | Another magnetic field | Obtain a specific magnetic field through project magnetic simulation | Select different thresholds based on a difference in simulation magnetic fields in different states |

For another example, refer to Table 2. When the wireless headset is used in the second-type case (for example, the case 800 in Embodiment 2), magnetic field simulation in each state is performed, and a vector threshold in each state is selected or set. A parameter a means a magnetic field vector sensed by the headset body 700 when the first magnet 805*a*, the second magnet 804*a*, and the third magnet 807*a* that are disposed in the case 800 have a same shape, size, and material and can generate a same magnetic field vector, and only a single magnet is disposed (for example, only the first magnet 805*a* is disposed, and the second magnet 804*a* and the third magnet 807*a* are neither disposed).

Certainly, in this embodiment of this application, parameters such as a size, a shape, and a material of the magnet included in the case 800 are not limited. For example, the parameters such as the size, the shape, and the material of the first magnet 805*a*, the second magnet 804*a*, and the third magnet 807*a* of the case 800 may be set to be consistent or may be adjusted based on an actual situation.

TABLE 2

Relationship between magnetic field simulation values and vector thresholds in various headset states in Embodiment 2

| State | Magnetic field (vector) | Simulation theoretical value | Vector threshold |
|---|---|---|---|
| A case is closed and a headset is placed in the case | Strongest | 2.24a millitesla (mT) | Vector sum > 2a mT |
| A case is open and a headset is adsorbed to an upper cover | Stronger | 1.4a mT | 1.2a mT < vector sum < 2a mT |
| A case is open and a headset is adsorbed to a lower cover | Weak | a mT | 0.5a mT < vector sum < 1.2a mT |
| A headset is out of a case | Weakest | < a mT, about o | Vector sum < 0.5a mT |

It may be understood that, based on Table 2, the headset body 700*a* detects magnetic field vectors in different states by using the magnetic sensor, and transmits the magnetic field vectors to the processor. Then, the processor determines the state of the headset body 700*a* based on the received magnetic field vectors and the preset vector threshold. For example, when determining that the vector sum satisfies a first vector threshold (for example, the vector sum >2a mT), the processor determines that the headset body 700*a* is in the state in which the case is closed and the headset is placed in the case. For another example, when determining that the vector sum satisfies a second vector threshold (for example, 1.2a mT<vector sum <2a mT), the processor determines that the headset body 700*a* is in the state in which the case is open and the headset is adsorbed to the upper cover. For another example, when determining that the vectors sum satisfies a third vector threshold (for example, 0.5 a mT<vector sum <1.2a mT), the processor determines that the headset body 700*a* is in a state in which the cover is the state in which the case is open and the headset is adsorbed to the lower cover. For another example, when determining that the vector sum satisfies a fourth vector threshold (for example, vector sum <0.5 a mT), the processor determines that the headset body 700*a* is in the out-of-case state.

It may be understood that, in the foregoing simulation process, the vector threshold is set by using the vector sum (namely, an absolute value of the vector). Certainly, in another embodiment, the threshold is not limited to the vector sum, that is, the threshold may alternatively be set based on another parameter, for example, a vector direction, a three-axis projection, a three-plane projection, or a specific plane projection, which is not limited herein. It may be understood that a larger vector threshold difference indicates higher precision of the three-axis Hall effect sensor used for detection, stronger system stability, and higher product consistency.

In conclusion, the following uses Embodiment 1 as an example to describe a principle of detecting various types of position/status information (for example, three types of position/status information) of the headset body 500*a* based on cooperation between the magnetic sensor 501 and the processor 502. In Embodiment 1, the magnetic sensor 501 may be configured to detect the magnetic field vector around the headset body 500*a*. The processor 502 may be configured to: respond to the magnetic field vector transmitted by the magnetic sensor 501, and compare the magnetic field vector with the preset vector threshold, to determine the status of the headset body 500*a*.

Based on some embodiments shown in FIG. 2 to FIG. 4, FIG. 5*a* to FIG. 5*f*, FIG. 6*a* to FIG. 6*e*, and FIG. 7, the following describes a method for detecting position/status information of a wireless headset provided in this application.

Figure 8:
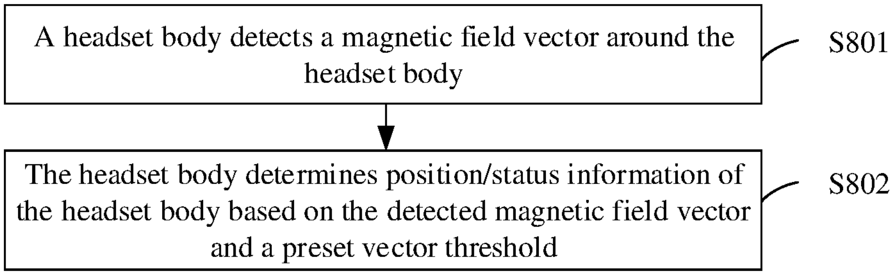
FIG. 8 is a flowchart of a method for detecting position/status information of a wireless headset according to an embodiment of this application.

FIG. 8 is a schematic flowchart of a method for detecting position/status information of a wireless headset according to an embodiment of this application. The method may be applied to the wireless headset (for example, the headset body 500*a* of the wireless headset) shown in FIG. 2 to FIG. 3, FIG. 5*a* to FIG. 5*f*, and FIG. 6*a* to FIG. 6*e*. For example, the headset body 500*a* may include a magnetic sensor 501 and a processor 502. Certainly, the headset body 500*a* may further include another component. For example, the headset body 500*a* may be the headset body 300 shown in FIG. 3. As shown in FIG. 8, the method may include the following steps.

S801: A headset body detects a magnetic field vector around the headset body.

For example, refer to Embodiment 1. A magnetic sensor 501 in the headset body 500*a* may detect a magnetic field vector around the headset body 500*a*. For another example, refer to Embodiment 2. A magnetic sensor in a headset body 700*a* may detect a magnetic field vector around the headset body.

S802: The headset body determines position/status information of the headset body based on the detected magnetic field vector and a preset vector threshold.

For example, S801 may be performed by a magnetic sensor in the headset body, and S802 may be performed by a processor in the headset body.

It may be understood that, in this embodiment of this application, for a specific method for detecting the position/status information of the headset body based on cooperation between the magnetic sensor and the processor, refer to the detailed descriptions in Embodiment 1, Embodiment 2, and FIG. 7. Details are not described herein again.

It may be understood that the case shown in the foregoing embodiments is a headset case. Certainly, a type of the case is not limited in this embodiment of this application. For example, the case may alternatively be another mechanism that may be configured to accommodate a wireless headset. In this case, the case and the wireless headset may form various types of fusion products.

The fusion product means a wireless headset used in various forms, such as a portable TWS headset, a health, sports and Health, Fitness, and easily storable watch, audio glasses (such as quick shooting, video recording, an audio speaker, and virtual 3D), a beautiful smart necklace, a bracelet, a wristband, a ring, a power bank, an adapter, a handbag, luggage, a head-mounted apparatus, a tie, a mobile phone, a drinking cup, a mouse, a pen, a notebook, a racket, a ball, and a bicycle. For example, a wireless headset and a watch may form a Bluetooth call watch, a wireless headset and glasses form audio glasses, and a wireless headset and a necklace form a smart necklace. The foregoing products all include a case or a carrier (referred to as the carrier below) for accommodating the wireless headset.

It may be understood that, for a multi-fusion body product, a form of a carrier may be identified. In addition, in this embodiment of this application, a three-axis Hall effect sensor is disposed, which has a function of reading magnitudes of magnetic fields on an x-axis, a y-axis, and a z-axis, so that status identification (namely, second-level identification) of a plurality of products can be met. In other words, the fusion product may generate second-level identification based on identification results of different forms. For example, when it is identified that the carrier is the necklace, after Bluetooth pairing, a smart necklace function is enabled, and second-level identification is performed on two states (a state in which the headset is in the necklace and a state in which the headset is out of the necklace). For example, when it is identified that the carrier is the headset case, after Bluetooth pairing, a TWS headset function is enabled, and second-level identification is performed on three states (an out-of-case state, a state in which the case is closed and the headset is placed in the case, and a state in which the case is open and the headset is placed in the case). For example, when it is identified that the carrier is the watch, after Bluetooth pairing, a smart storable watch function is enabled, and second-level identification is performed on four states (an out-of-case state, a state in which the case is closed and the headset is placed in the case, a state in which the headset is placed on an upper cover of the case, and a state in which the headset is placed on a lower cover of the case). Certainly, the watch and the like may also have another different state combination. This is not limited herein. It may be understood that form identification of the carrier may also be alternating magnetic field identification. For example, when a magnetic field of the carrier senses device pairing, the carrier modulates a magnetic field vector by using an electrical signal, to complete magnetic vector communication and perform device ID identification.

In conclusion, this application has at least the following beneficial effect:

(1) The multi-position/status information detection method in this application is simple and easy to implement. The method uses at least one magnet and at least one magnetic sensor (for example, the three-axis Hall effect sensor), and uses the magnetic sensor to read the magnitudes of the magnetic fields on the x-axis, the y-axis, and the z-axis. This can be used in detection of at least three types of position/status information (for example, the out-of-case state, the state in which the case is closed and the headset is placed in the case, and the state in which the case is open and the headset is placed in the case) of the current TWS headset. In addition, the three-axis Hall effect sensor has a mass production capability for extension of a plurality of states. In this way, detection of a plurality of states can be performed by one device, and expandability is high. In addition, more reliable and diversified status detection can be implemented based on current interaction between electricity and a wireless communication mechanism (such as power-on/off, a battery level, two-headset interaction, and left/right headset identification).

(2) In this application, the three-axis Hall effect sensor is disposed at the central axis position of the headset body, so that a plurality of types of position/status information can be accurately detected without identifying a headset placement direction and a left headset and a right headset. This resolves a disadvantage in a conventional technology that detection can be performed only in a single direction and detection can be performed only on an in-case state and an out-of-case state of a headset. This implements 360-degree rotation detection without a dead angle. In addition, in this application, the three-axis Hall effect sensor is disposed, and has a strong anti-interference capability, so that a worse magnetic field environment can be allowed in an external environment, and a product can provide better user experience by using a magnetic field environment.

(3) The wireless headset in this application may be applicable to a TWS headset form, and is applicable to all existing and unimplemented fusion products in the industry, such as a headset and a watch, a headset and a necklace, and a headset and glasses. In addition, for different forms of products, multi-level magnetic environment detection can be implemented. In addition, based on magnet cooperation of the case, the magnetization direction of the magnet may be optimized (for example, magnet directions of two magnets are the same), so that detection is more accurate.

(4) The wireless headset in this application may also be used in a TWS headset of a special form or another fusion product, for example, may be applied to a headset that can freely rotate in an accommodation compartment, such as a cylindrical-shaped headset, and a cylindrical-like shaped headset (a bullet-shaped headset). In addition, based on magnet cooperation of the case, the magnetization direction of the magnet may be optimized, so that detection is more accurate.

It should be understood that the implementations of this application may be randomly combined, for example, may be used separately, or may be used in combination with each other, to implement different technical effect. This is not limited herein.

The foregoing content is only specific implementations of this application, but is not intended to limit the protection scope of embodiments of this application. Any variation or replacement within the technical scope disclosed in embodiments of this application shall fall within the protection scope of embodiments of this application. Therefore, the protection scope of this application shall be subject to the protection scope of the claims.

What is claimed is:

1. A wireless headset system, comprising:

a wireless headset, comprising a processor and a magnetic sensor coupled to the processor, wherein the magnetic sensor is configured to detect a magnetic field vector around the wireless headset, and transmit the detected magnetic field vector to the processor, and wherein the magnetic sensor is a three-axis Hall effect sensor; and a case comprising a first cover, a second cover, and an accommodation compartment, wherein the accommodation compartment is configured to accommodate the wireless headset, a first magnet is disposed on the first cover, a second magnet is disposed on the second cover, and the first magnet and the second magnet are on opposite sides of the wireless headset and the magnetic sensor is between the first magnet and the second magnet when the wireless headset is accommodated in the accommodation compartment; and wherein the processor is configured to:

determine the case is closed and the headset is placed in the case when the received magnetic field vector satisfies a first vector threshold;

determine that the case is open and the headset is placed in the case when the received magnetic field vector satisfies a second vector threshold; and determine that the wireless headset is in an out-of-case state when the received magnetic field vector satisfies a third vector threshold.

2. The wireless headset system according to claim 1, wherein a third magnet is disposed on the first cover, and the third magnet is configured to attach the wireless headset to the first cover.

3. The wireless headset system according to claim 2, wherein the third magnet and the first magnet are disposed at intervals.

4. The wireless headset system according to claim 2, wherein the third magnet and the first magnet are connected together.

5. The wireless headset system according to claim 1, wherein the processor is further configured to determine, based on the received magnetic field vector, that the wireless headset is in the state in which the case is open and the headset is placed on the first cover of the case.

6. The wireless headset system according to claim 1, wherein at least a portion of the wireless headset is symmetric around a central axis, and the magnetic sensor is disposed along the central axis.

7. The wireless headset system according to claim 1, wherein the wireless headset is configured to rotate freely in the accommodation compartment.

8. The wireless headset system according to claim 1, wherein the wireless headset further comprises a magnet that is configured to attach to the case, so that the wireless headset is accommodated in the case.

9. The wireless headset system according to claim 1, wherein an attach magnet is further disposed on the case, and is configured to implement closure and attachment of both the second cover and the first cover of the case, and the attachment magnet is outside of the accommodation compartment.

10. The wireless headset system according to claim 1, wherein the case is a headset case.

11. The wireless headset system according to claim 1, wherein the case is a carrier, the carrier is one of a watch, glasses, a necklace, a bracelet, a wristband, a ring, a power bank, an adapter, a handbag, luggage, a head-mounted apparatus, a tie, a mobile phone, a drinking cup, a mouse, a pen, a notebook, a racket, a ball, or a bicycle, and both the carrier and the wireless headset form a fusion product.

12. The wireless headset system according to claim 1, wherein determining that the case is open and the headset is placed in the case when the received magnetic field vector satisfies the second vector threshold comprises:

determining that the case is open and the headset is placed on the first cover.

13. The wireless headset system according to claim 1, wherein determining that the case is open and the headset is placed in the case when the received magnetic field vector satisfies the second vector threshold comprises:

determining that the case is open and the headset is placed on the second cover.

14. A wireless headset, wherein the wireless headset is configured to be accommodated in an accommodation compartment of a case, the wireless headset comprises a processor and a magnetic sensor coupled to the processor, the magnetic sensor is configured to detect a magnetic field vector around the wireless headset, and transmit the detected magnetic field vector to the processor, wherein the magnetic sensor is a three-axis Hall effect sensor, and the processor is configured to:

determine the case is closed and the headset is placed in the case when the received magnetic field vector satisfies a first vector threshold;

determine that the case is open and the headset is placed in the case when the received magnetic field vector satisfies a second vector threshold; and determine that the wireless headset is in an out-of-case state when the received magnetic field vector satisfies a third vector threshold; and wherein the case comprises a first cover, a second cover, and the accommodation compartment, wherein a first magnet is disposed on the first cover, a second magnet is disposed on the second cover, and the first magnet and the second magnet are on opposite sides of the wireless headset and the magnetic sensor is between the first magnet and the second magnet when the wireless headset is accommodated in the accommodation compartment.

15. The wireless headset according to claim 14, wherein at least a portion of the wireless headset is symmetric around a central axis, and the magnetic sensor is disposed along the central axis.

16. The wireless headset according to claim 14, wherein the wireless headset is configured to rotate freely in the accommodation compartment.

17. The wireless headset according to claim 14, wherein the wireless headset is in a cylindrical shape.

18. The wireless headset according to claim 14, wherein the wireless headset further comprises a magnet that is configured to attach to the case, so that the wireless headset is accommodated in the case.

* * * * *